United States Patent
Watanabe et al.

(10) Patent No.: US 9,332,275 B2
(45) Date of Patent: May 3, 2016

(54) METHODS, APPARATUSES, AND PROGRAMS

(71) Applicant: NIPPON TELEGRAPH AND TELEPHONE CORPORATION, Tokyo (JP)

(72) Inventors: Mayuko Watanabe, Yokosuka (JP); Masaki Kitahara, Yokosuka (JP); Atsushi Shimizu, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 75 days.

(21) Appl. No.: 14/363,994

(22) PCT Filed: Dec. 12, 2012

(86) PCT No.: PCT/JP2012/082174
§ 371 (c)(1),
(2) Date: Jun. 9, 2014

(87) PCT Pub. No.: WO2013/089129
PCT Pub. Date: Jun. 20, 2013

(65) Prior Publication Data
US 2014/0355678 A1    Dec. 4, 2014

(30) Foreign Application Priority Data
Dec. 13, 2011  (JP) ................................. 2011-271841

(51) Int. Cl.
*H04N 19/593* (2014.01)
*H04N 19/105* (2014.01)
(Continued)

(52) U.S. Cl.
CPC ........... *H04N 19/593* (2014.11); *H04N 19/105* (2014.11); *H04N 19/137* (2014.11);
(Continued)

(58) Field of Classification Search
None
See application file for complete search history.

(56) References Cited

U.S. PATENT DOCUMENTS

| 2,905,756 A | 9/1959 | Graham |
| 2007/0071087 A1* | 3/2007 | Kim ................. H04N 19/176 375/240.1 |

(Continued)

FOREIGN PATENT DOCUMENTS

| EP | 1 761 064 A2 | 3/2007 |
| EP | 2 352 296 A1 | 8/2011 |

(Continued)

OTHER PUBLICATIONS

Wang, Li-Li, et al., "Improved lossless coding algorithm in H.264/AVC based on hierarchical intraprediction and coding-mode selection," Journal of Electronic Imaging, vol. 20., No. 4, Oct.-Dec. 2011, pp. 043001-1-043001-10.

(Continued)

*Primary Examiner* — Tracy Li
*Assistant Examiner* — Nam Pham
(74) *Attorney, Agent, or Firm* — Harness, Dickey & Pierce, P.L.C.

(57) ABSTRACT

Compared to conventional intra divided-picture encoding, deterioration in the coding efficiency is suppressed and the encoding computational complexity and the decoding computational complexity are reduced. A divided picture generating unit divides an input encoding target picture into blocks of the same size and generates divided pictures having the same size by collecting pixels having the same relative position within each block. An intra divided-picture encoding processing unit performs intra divided-picture encoding on part of the divided pictures. An inter divided-picture encoding processing unit performs inter divided-picture encoding using another encoded divided picture as a reference picture. When there are a plurality of candidates for the reference picture, a correlation direction calculating unit obtains a combination in which a correlation of a pixel on an original picture is high among combinations of encoded divided pictures and their reference pictures. A reference picture selecting unit selects an encoded divided picture in a direction in which a correlation with an encoding target divided picture is high as the reference picture to be used in the inter divided-picture encoding processing unit.

18 Claims, 19 Drawing Sheets

(51) Int. Cl.
*H04N 19/176* (2014.01)
*H04N 19/61* (2014.01)
*H04N 19/154* (2014.01)
*H04N 19/137* (2014.01)
*H04N 19/82* (2014.01)
*H04N 19/86* (2014.01)

(52) U.S. Cl.
CPC ........... *H04N19/154* (2014.11); *H04N 19/176* (2014.11); *H04N 19/61* (2014.11); *H04N 19/82* (2014.11); *H04N 19/86* (2014.11)

(56) References Cited

U.S. PATENT DOCUMENTS

| | | |
|---|---|---|
| 2007/0206872 A1 | 9/2007 | Song |
| 2010/0208803 A1 | 8/2010 | Matsuo et al. |

FOREIGN PATENT DOCUMENTS

| | | |
|---|---|---|
| JP | 64-007854 A | 1/1989 |
| JP | 03-187694 A | 8/1991 |
| JP | 06-078294 A | 3/1994 |
| JP | 2000-299866 A | 10/2000 |
| JP | 2009-528762 A | 8/2009 |
| RU | 2010 113 343 A | 10/2011 |
| TW | I293228 | 2/2008 |
| TW | I320286 | 2/2010 |
| TW | I323602 | 4/2010 |
| TW | I323614 | 4/2010 |
| WO | 2007/100221 A1 | 9/2007 |
| WO | 2010/055675 A1 | 5/2010 |

OTHER PUBLICATIONS

Lai, Changcai, et al., "New intra prediction using the correlation between pixels and lines," Joint Collaborative Team on Video Coding of ITU-T SG16 WP3 and ISO/IEC JTC1/SC29/WG11, doc. JCTVC-A025, 1st Meeting: Dresden, Germany, Apr. 15-23, 2010.

Tan, Yih Han, et al., "Intra-prediction with Adaptive Sub-sampling," Joint Collaborative Team on Video Coding of ITU-T SG16 WP3 and ISO/IEC JTC1/SC29/WG11, doc. JCTVC-B025, 2nd Meeting: Geneva, Switzerland, Jul. 21-28, 2010.

Extended Search Report, European Patent Application No. 12857396.1, Jun. 29, 2015.

Notice of Reasons for Rejection, Japanese Patent Application No. 2011-271841, Mar. 10, 2015.

ITU-T Rec. H.264, "Advanced video coding for generic audiovisual services," Mar. 2005.

J. Yang, B. Yin, Y. Sun, and N. Zhang, "A block-matching based intra frame prediction for H.264/AVC," in Proceedings of IEEE International Conference on Multimedia and Expo (ICME '06), pp. 705-708, Toronto, Canada, Jul. 2006.

Mayuko Watanabe, Masaki Kitahara, Atsushi Shimizu, Hirohisa Jozawa: "A Study on low complexity decoding of intra coding," Proceedings of the 2011 Institute of Electronics, Information, and Communication Engineers (IEICE) General Conference, D-11-39, Mar. 2011, with translation thereof.

Mayuko Watanabe et al., "Fukugo Enzanryo Teigen ni Muketa Gamennai Fugoka eno Naiso Yosoku Tekiyo ni Kansuru Fugoka Koritsu Kaizen no Ichi Kento", FIT2011 Dai 10 Kai Forum on Information Technology Koen Ronbunshu, separate vol. 3, Aug. 22, 2011, pp. 415 to 416.

Mayuko Watanabe et al., "Fukugo Enzanryo Teigen ni Muketa Gamennai Fugoka eno Naiso Yosoku Tekiyo ni Kansuru Ichi Kosatsu", The Institute of Image Information and Television Engineers 2011 Nen Nenji Taikai Koen Yokoshu, Aug. 1, 2011.

International Search Report for PCT/JP2012/082174, ISA/JP, mailed Jan. 29, 2013, with English translation.

Notice of Allowance, Taiwanese Patent Application No. 101146821, Nov. 20, 2014.

Notice of Allowance, Japanese Patent Application No. 2011-271841, Aug. 11, 2015.

Notice of Allowance, Russian Patent Application No. 2014123658, Jan. 14, 2016.

* cited by examiner

METHODS, APPARATUSES, AND PROGRAMS FOR ENCODING AND DECODING PICTURE

CROSS REFERENCE TO RELATED APPLICATIONS

This application is a 371 U.S. National Stage of International Application No. PCT/JP2012/082174, filed Dec. 12, 2012. Priority is claimed on Japanese Patent Application No. 2011-271841, filed Dec. 13, 2011; the entire content of both applications is incorporated herein by reference.

TECHNICAL FIELD

The present invention relates to picture encoding and decoding technologies, and more particularly, to a picture encoding method, a picture decoding method, a picture encoding apparatus, a picture decoding apparatus, a picture encoding program, and a picture decoding program which realize encoding and decoding capable of reducing the decoding computational complexity while suppressing degradation in the coding efficiency as compared to conventional intra-frame predictive encoding and decoding.

BACKGROUND ART

In H.264, which is an international video coding standard, intra-frame predictive coding has been performed in order to improve a compression rate in coding using a correlation of pixels between blocks (see Non-Patent Document 1). This intra-frame prediction is performed in units of blocks in which some pixels are collected, and three types of block sizes of 4×4, 8×8, and 16×16 are available to a luminance signal. In addition, selection from a plurality of prediction modes is possible for each block size.

This H.264 uses a method based on extrapolative prediction at the time of intra-frame prediction, but there is a problem in that the prediction efficiency is low. In order to solve this problem, suppression of block distortion using a deblocking filter for an entire frame is performed and thus the computational complexity is increased.

In addition, technology described in Non-Patent Document 2 is known as a technique of improving the coding efficiency in intra-frame prediction. This technology is a technique in the intra-frame prediction which searches encoded areas for a block having a small error and performs encoding using the prediction error therefor with respect to an encoding target bock.

FIG. 19 is a flowchart illustrating an example of an intra-frame predictive encoding process in accordance with the conventional art. In the intra-frame predictive encoding of Non-Patent Document 2, first, an encoding target picture is divided into N blocks 1 to N having the same size (step S801). Next, intra-frame predictive encoding is performed on the first block 1 (step S802). Subsequently, in encoding of blocks 2 and subsequent blocks, inter-frame predictive encoding is performed using a block having a small prediction error in encoded areas as a reference picture and information on a motion vector to the reference picture and a prediction error are encoded (step S803). The process of step S803 is iterated up to the final block N.

The technology proposed in Non-Patent Document 2 is a technique of improving the coding efficiency, and a quantization error also tends to be reduced because it is possible to suppress the occurrence of a prediction error in an area in which the same pattern is iterated. Thus, it is considered possible to reduce the processing complexity of the deblocking filter.

However, while the method described above may be effective on a picture in which the same pattern is iterated, it is not effective on a picture in which substantially the same pattern does not appear; in this case, neither a prediction error nor a quantization error may be considered to be significantly reduced. In this case, because it is also impossible to reduce the processing complexity of the deblocking filter, it is not considered to be effective in reducing the decoding computational complexity. Furthermore, because it is necessary to transmit offset vector information representing the relative position of a reference block for each block to a decoding end, there is a problem in that a calculation required to decode reference block information also occurs in the decoding end and thus the computational complexity is still large.

In order to solve the problem in the technology of Non-Patent Document 2, in Non-Patent Document 3, the present inventors et al. have proposed technology which reduces the encoding computational complexity and the decoding computational complexity while suppressing the degradation in the coding efficiency.

FIG. 20 is a diagram describing the technology proposed in Non-Patent Document 3. In this proposed technology, in intra-frame encoding of an original picture PIC1, the original picture PIC 1 is separated into four divided pictures PIC 10 to PIC 13 having strong correlations between pixels at the same position. It is to be noted that squares to which numeric values of 0, 1, 2, and 3 are attached in the drawing represent pixels. That is, the divided pictures PIC 10 to PIC 13 are set by dividing the original picture PIC 1 of an input encoding target into blocks each having 2×2 pixels and collecting pixels at the same relative position within each block. Intra-frame encoding is performed on one divided picture PIC 10 thereamong, and predictive encoding is performed by generating a reference picture from an encoded picture in accordance with a separation method for each of the remaining three divided pictures PIC11, PIC12, and PIC13.

Although a strong deblocking filter is applied to the first divided picture PIC10 on which the intra-frame encoding is performed, the strength of the deblocking filter is decreased by employing inter-frame encoding having high prediction efficiency for the second to fourth divided pictures PIC11, PIC12, and PIC13. Thus, it is possible to reduce the computational complexity in a deblocking process as a whole and reduce the decoding computational complexity while maintaining the coding efficiency.

A processing procedure of the present technique is as follows.

(1) The original picture PIC1 is divided into the four divided pictures PIC 10 to PIC 13 as illustrated in FIG. 20.
(2) The first divided picture PIC 10 is encoded by intra-frame encoding.
(3) A picture is generated by shifting an encoded picture of the divided picture PIC 10 to the right by a half pixel using a half-pixel filter.
(4) Inter-frame encoding is performed on the second divided picture PIC 11 by determining the picture generated in (3) as a reference picture and setting a motion vector to 0.
(5) A picture is generated by shifting the encoded picture of the divided picture PIC10 down by a half-pixel using the half-pixel filter.
(6) Inter-frame encoding is performed on the third divided picture PIC 12 by determining the picture generated in (5) as a reference picture and setting a motion vector to 0.

(7) A picture is generated by shifting an encoded picture of the divided picture PIC 12 to the right by a half-pixel using the half-pixel filter.

(8) Inter-frame encoding is performed on the fourth divided picture PIC 13 by determining the picture generated in (7) as a reference picture and setting a motion vector to 0.

This example describes a case in which encoding is performed by dividing the input original picture PIC 1 of the encoding target into the blocks each having 2×2 pixels, collecting the pixels at the same relative position within each block, and setting the four divided pictures PIC 10 to PIC13. However, to further generalize, the divided pictures may be set by dividing the original picture into blocks each having n×m pixels and rearranging a plurality of pixel groups (here referred to as sub-blocks) at the same relative position in each block. A sub-block has $n_1 \times m_1$ pixels (where $1 \le n_1 < n$ and $1 \le m_1 < m$).

In the conventional technique, encoding is performed as follows. First, one or more pixels (sub-blocks) are extracted from an input picture at equal intervals, a plurality of divided pictures are generated by collecting these sub-blocks, and intra divided-picture encoding in which at least one divided picture is encoded using only the divided picture is performed. In encoding of the other divided pictures, inter divided-picture predictive encoding is performed using an encoded divided picture. That is, in accordance with the relative positional relationship between a pixel included in an encoding target divided picture and a pixel included in an encoded divided picture based on a reference picture using the encoded divided picture as the reference picture, a predicted picture is generated by, for example, applying, to the reference picture, a filter as used when an interpolation picture of decimal pixel accuracy is generated and an error signal between the predicted picture and the encoding target divided picture is encoded.

FIG. 21 is a flowchart of a process of a conventional technique.

First, in step S900, divided pictures P0 to PN are generated by dividing a picture into blocks of the same size. Next, in step S901, intra divided-picture encoding is performed on some divided pictures P0 to PM (where 0≤M<N) among the generated divided pictures P0 to PN. Subsequently, in step S902, inter divided-picture encoding is performed on divided pictures P(M+1) to PN using an encoded block as a reference picture.

PRIOR ART DOCUMENTS

Non-Patent Documents

Non-Patent Document 1: ITU-T Rec. H.264, "Advanced video coding for generic audiovisual services," March 2005.

Non-Patent Document 2: J. Yang, B. Yin, Y. Sun, and N. Zhang, "A block-matching based intra frame prediction for H.264/AVC," in Proceedings of IEEE International Conference on Multimedia and Expo (ICME '06), pp. 705-708, Toronto, Canada, July 2006.

Non-Patent Document 3: Mayuko Watanabe, Masaki Kitahara, Atsushi Shimizu, Hirohisa Jozawa: "A Study on low complexity decoding of intra coding," Proceedings of the 2011 Institute of Electronics, Information, and Communication Engineers (IEICE) General Conference, D-11-39, March 2011.

SUMMARY OF INVENTION

Problems to be Solved by the Invention

In a decoding process in video coding such as H.264, which is an international video coding standard, a deblocking filter which is used to reduce block distortion occupies a large proportion of the processing complexity. If a method for performing predictive encoding between divided pictures obtained by extracting and rearranging pixels or pixel groups in accordance with a given rule proposed in Non-Patent Document 3 is used to address this problem, it is possible to suppress the generation of block distortion. This method makes it possible to reduce the computational complexity of the deblocking filter because the number of positions to which the deblocking filter is applied is reduced.

However, in this method, there is room for improvement with respect to the following points.

(1) First, when two or more reference pictures are used in inter divided-picture encoding, a reference picture index representing a reference picture used in predictive encoding should be encoded in order to identify a reference picture to be used during decoding, and thus a bit amount is increased. Thus, the coding efficiency deteriorates. In contrast, if the direction of the reference picture is fixed, the prediction accuracy is decreased and the coding efficiency deteriorates.

(2) In addition, there is a problem in that the bit amount is further increased because a reference picture index should be sent to the decoding end for every block when the reference picture is switched for every block within the divided pictures, and the bit amount is increased due to encoding of reference picture indices.

An object of the present invention is to improve the coding efficiency by improving the above-described inter divided-picture encoding and making encoding of a reference picture index unnecessary in the inter divided-picture encoding.

Means for Solving the Problems

The most significant feature of the present invention is that, in a picture encoding scheme of performing a process of intra-frame predictive encoding (the same is also applied to decoding) by intra divided-picture encoding and inter divided-picture encoding using divided pictures obtained by rearranging pixels (or pixel groups), when a reference picture to be referred to in the inter divided-picture encoding is selected, an encoded divided picture to which a pixel in a direction having a high correlation with a pixel on an original picture of an encoding target divided picture belongs is obtained and determined as the reference picture. In addition, it is unnecessary to encode a reference picture index representing the encoded divided picture selected as the reference picture using a common selection logic between an encoder (picture encoding apparatus) and a decoder (picture decoding apparatus) in selection of the reference picture.

The present invention performs the following process in compression encoding of an input picture.

(1) Divided pictures of the same size are generated by dividing the input picture into blocks each having n×m pixels, dividing each divided block into sub-blocks each having $n_1 \times m_1$ pixels (where $1 \le n_1 < n$ and $1 \le m_1 < m$), and collecting sub-blocks at the same relative position in the blocks.

(2) Intra divided-picture encoding is performed on at least one of the divided pictures. Here, the intra divided-picture encoding is encoding by intra-frame prediction using a divided picture as a frame unit.

(3) In order to encode a divided picture other than the divided picture subjected to the intra divided-picture encoding, an encoded divided picture having a short distance on the original picture with respect to pixels at the same position in the encoding target divided picture and encoded divided pictures is selected as a reference picture to be used in inter divided-picture predictive encoding of an encoding target divided picture. When there are a plurality of candidates for the reference picture, an encoded divided picture to which a pixel in a direction having a high correlation with a pixel of the encoding target divided picture belongs is obtained and selected as the reference picture. That is, the encoded divided picture having the high correlation is used as the reference picture. Whether the correlation is high is determined from, for example, prediction errors of the encoded divided picture.

(4) A predicted picture for the encoding target divided picture is generated using the selected reference picture, and inter divided-picture predictive encoding is performed. In this inter divided-picture predictive encoding, for example, inter divided-picture predictive encoding is performed using, as the predicted picture, a picture obtained by applying a predetermined filter determined in accordance with the relative position between corresponding pixels of the encoding target divided picture and the reference picture on the original picture to the reference picture. Here, the inter divided-picture predictive encoding is encoding by inter-frame prediction which is performed using each divided picture as a frame unit.

(5) An encoded bitstream is output by performing information source encoding on encoding results by the above intra divided-picture encoding and inter divided-picture predictive encoding.

The selection of the reference picture in the above-described process (3) can be performed for each of areas (corresponding to macroblocks or the like of H.264) each having $n_2 \times m_2$ pixels obtained by dividing the encoding target divided picture. Here, this area is referred to as a divided picture block. That is, by selecting a reference picture having a high correlation for every divided picture block of an encoding target, inter divided-picture predictive encoding in which the reference picture is switched to an optimum one in one encoding target divided picture can be performed.

The following are two methods as a process of obtaining an encoded divided picture to which a pixel in a direction having a high correlation belongs in the above-described process (3).

In a first method, a sum of prediction errors between a decoded picture of an encoded divided picture serving as a candidate for a reference picture and a predicted picture created from a reference picture of the encoded divided picture is calculated for each candidate for the reference picture. Then, a combination of the encoded divided picture and the reference picture in which the sum of the prediction errors is small is obtained and a direction connecting pixels on an original picture of corresponding pixels within these pictures is determined as the direction in which the correlation is high. An encoded reference picture to which a pixel in the direction having the high correlation belongs for the encoding target divided picture is determined as a reference picture to be used in encoding of an encoding target divided picture.

In a second method, instead of generating the predicted picture for the encoded divided picture and calculating the errors as in the first method, a sum of prediction errors already present as encoded data by the inter divided-picture encoding is calculated, a correlation is determined from the sum of the prediction errors, and a reference picture is selected, thereby suppressing an increase in the decoding computational complexity.

In the above-described first method, in order to calculate the direction in which the correlation is high, the differences (errors) between the decoded picture of the picture subjected to the inter divided-picture encoding and the predicted picture created from its reference picture are calculated. However, when the predicted picture is regenerated for every divided picture or every divided picture block and a difference from the decoded picture of the picture subjected to the divided-picture encoding is calculated, the computational complexity is significantly increased.

In contrast, in the second method, it is possible to significantly reduce an increase in the encoding/decoding computational complexity while maintaining the effect substantially equal to that of the first method by calculating the sum of the prediction errors using the prediction errors generated as encoded data in advance and determining the correlation.

In addition, in the present invention, the following process is carried out in performing decoding on encoded data of a picture encoded by the above-described method.

(1) Encoded data obtained by dividing an input picture into blocks each having n×m pixels, dividing each divided block into sub-blocks each having $n_1 \times m_1$ pixels (where $1 \leq n_1 < n$ and $1 \leq m_1 < m$), collecting sub-blocks at the same relative position within the blocks to generate divided pictures of the same size, and performing encoding in a picture encoding apparatus is input and information source decoding is performed thereon.

(2) Intra divided-picture decoding is performed on at least one of the divided pictures from decoded data.

(3) When a divided picture other than the divided picture subjected to the intra divided-picture decoding is decoded, a decoded divided picture having a short distance on the original picture with respect to pixels at the same position in the decoding target divided picture and decoded divided pictures is selected as a reference picture to be used in inter divided-picture predictive decoding for a decoding target divided picture. When there are a plurality of candidates for the reference picture, a decoded divided picture to which a pixel in a direction having a high correlation with a pixel of the decoding target divided picture belongs is obtained and selected as the reference picture. That is, the decoded divided picture having the high correlation is used as the reference picture for the decoding target divided picture. Whether the correlation is high is determined from, for example, prediction errors of the decoded divided picture.

(4) A predicted picture for the decoding target divided picture is generated using the selected reference picture and inter divided-picture predictive decoding is performed.

(5) A decoded picture is configured by arranging each pixel in each divided picture at an original position in the original picture from the divided pictures decoded by the intra divided-picture decoding and the inter divided-picture predictive decoding.

The selection of the reference picture in the above-described process (3) can be performed for each of divided picture blocks each having $n_2 \times m_2$ pixels obtained by dividing the decoding target divided picture.

In addition, a method similar to the first or second method at the time of encoding described above is used in a process of obtaining a decoded divided picture to which a pixel in a direction having a high correlation belongs in the above-described process (3).

The operation of the present invention is as follows. In the conventional inter divided-picture encoding method, it is necessary to create and encode a reference picture index representing an encoded divided picture used as a reference picture. In the present invention, overhead of the reference picture index is eliminated by employing a divided picture having a high correlation as a reference picture instead of creating and encoding the reference picture index. Thereby, the coding efficiency is improved.

Details thereof are as follows. In the conventional art, selection from a plurality of reference pictures is possible and it is necessary to, for example, measure a square error between a predicted picture capable of being created from each reference picture and an encoded divided picture, select a reference picture having a small square error, and encode its reference picture index, in order to select a reference picture having high coding efficiency from among the reference pictures. In particular, when the reference picture is switched for every divided picture block, a bit amount of the reference picture index occurs for every divided picture block and the bit amount is increased.

In the present technique, using the fact that there is a strong spatial correlation between divided pictures which are originally one original picture, a correlation between a picture which has been subjected to inter divided-picture encoding and is to be used as a reference picture and a reference picture of the encoded picture is estimated using errors with a predicted picture. A direction in which the errors are small is estimated as a direction in which the correlation is highest, and the direction is used as a reference direction in an encoding target divided picture. Because the strength of the correlation depending on the direction is considered to be constant between adjacent pixels in the original picture, even when information specifying a reference picture such as a reference picture index is not sent to a decoder end, it is possible to suppress a deterioration in improvement in the coding efficiency by encoding prediction errors using a picture in the reference direction viewed from the encoding target divided picture as a reference picture.

In particular, in the present technique, it is not necessary to encode information specifying the reference picture such as the reference picture index because both an encoder and a decoder can select the same reference picture in accordance with the same process using only information of encoded/decoded pictures and it is possible to reduce a bit amount therefor.

Advantageous Effects of the Invention

In accordance with the present invention, in intra-frame predictive encoding using a method for generating divided pictures divided by extracting pixels or a pixel group from an encoding target picture and performing intra divided-picture encoding and inter divided-picture encoding on the divided pictures, it is possible to select an appropriate reference picture to be used in the inter divided-picture encoding and it is unnecessary to encode a reference picture index representing a reference picture. Thus, it is possible to improve the coding efficiency and reduce the computational complexity involved in a deblocking filter process.

MODES FOR CARRYING OUT THE INVENTION

Hereinafter, embodiments of the present invention will be described with reference to the drawings.

[Picture Encoding Apparatus]

Figure 1:
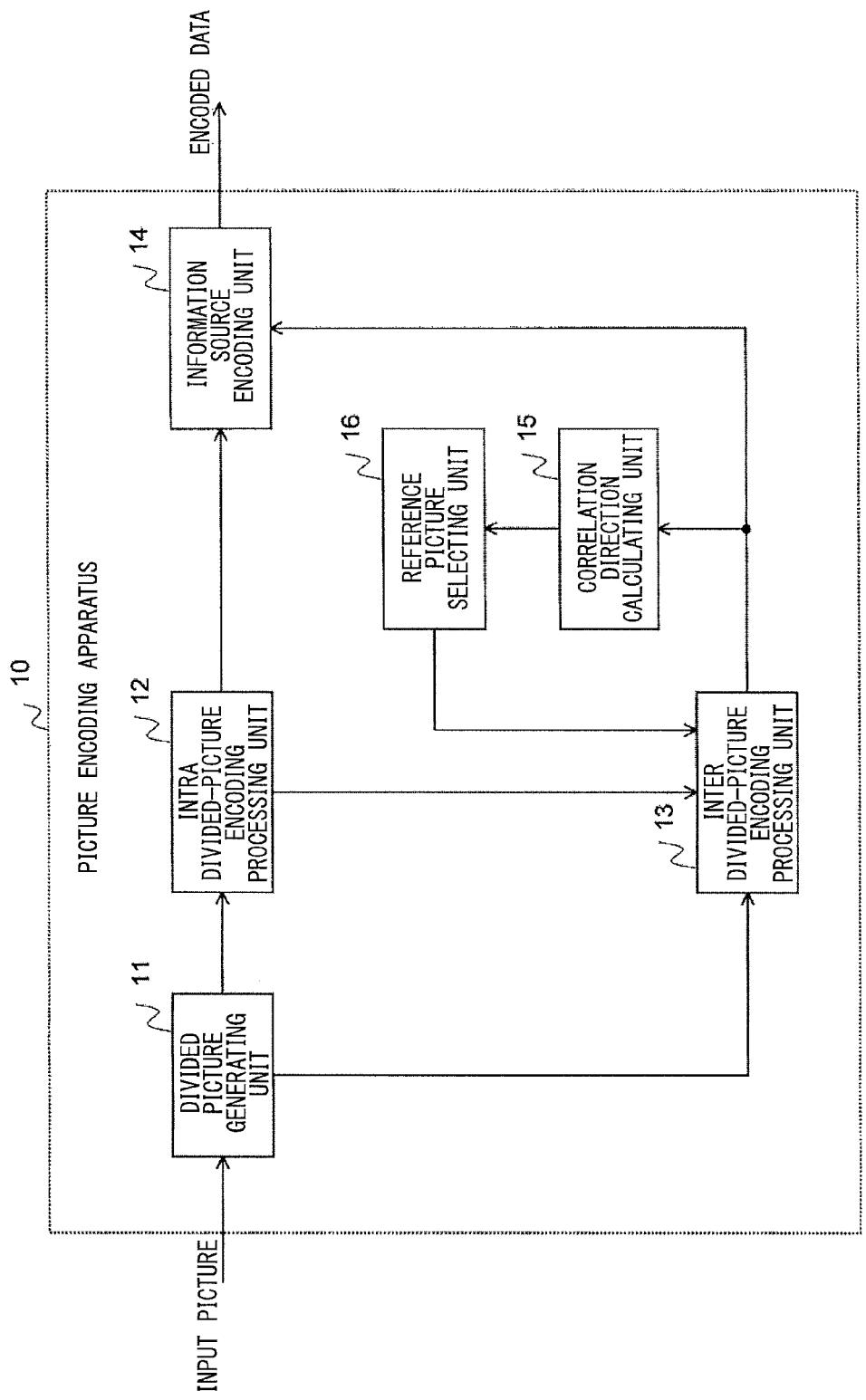
FIG. 1 is a diagram illustrating an example of a configuration of a picture encoding apparatus.

FIG. 1 is a diagram illustrating an example of a configuration of the picture encoding apparatus. The picture encoding apparatus 10 includes a divided picture generating unit 11, an intra divided-picture encoding processing unit 12, an inter divided-picture encoding processing unit 13, a correlation direction calculating unit 15, a reference picture selecting unit 16, and an information source encoding unit 14.

The divided picture generating unit 11 divides an input picture into blocks each having n×m pixels, divides each divided block into sub-blocks each having $n_1 \times m_1$ pixels (where $1 \le n_1 < n$ and $1 \le m_1 < m$), and collects sub-blocks at the same relative position within the blocks to generate divided pictures of the same size.

Figure 2:
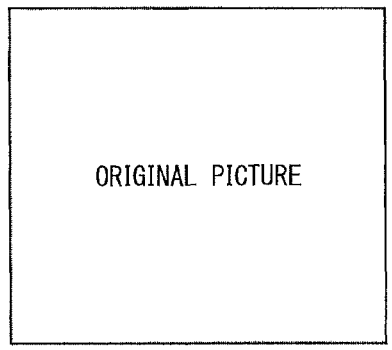
FIG. 2A is a diagram illustrating an example of generating divided pictures by a divided picture generating unit.
FIG. 2B is a diagram illustrating an example of generating the divided pictures by the divided picture generating unit.
FIG. 2C is a diagram illustrating an example of generating the divided pictures by the divided picture generating unit.
FIG. 2D is a diagram illustrating an example of generating the divided pictures by the divided picture generating unit.

FIGS. 2A to 2D are diagrams each illustrating an example of generating divided pictures by the divided picture generating unit 11. For example, the divided picture generating unit 11 uses an original picture illustrated in FIG. 2A as the input picture and divides the original picture into blocks Mj (j=0, 1, ..., J) each having n×m pixels as illustrated in FIG. 2B. Next, the divided picture generating unit 11 divides each block Mj into sub-blocks Bjk (k=0, 1, ..., K) each having $n_1 \times m_1$ pixels (where $1 \leq n_1 < n$ and $1 \leq m_1 < m$) as illustrated in FIG. 2C.

Next, as illustrated in FIG. 2D, the divided picture generating unit 11 generates divided pictures Pk (k=0, 1, ..., K) of the same size by collecting sub-blocks Bjk at the same relative position within the blocks from each block Mj. A divided picture P0 is a collection of sub-blocks B00, B10, ..., and BJ0, a divided picture P1 is a collection of sub-blocks B01, B11, ..., and BJ1, ..., and a divided picture PK is a collection of sub-blocks B0K, B1K, ..., and BJK.

The intra divided-picture encoding processing unit 12 performs intra divided-picture encoding on some divided pictures (which may be only a first divided picture) including the first divided picture generated by the divided picture generating unit 11. Here, any encoding method of performing encoding using only pixel information of a divided picture serving as a current encoding target without referring to other divided pictures may be used as the intra divided-picture encoding. For example, it is possible to use a method such as intra-predictive encoding in an H.264 coding scheme.

The inter divided-picture encoding processing unit 13 performs inter divided-picture encoding on a divided picture that is not yet encoded among the divided pictures generated by the divided picture generating unit 11. In this inter divided-picture encoding, an encoded divided picture is used as a reference picture, and a predicted picture is generated by applying, to the reference picture, a predetermined filter determined by the relative position between corresponding pixels on the original picture of a divided picture serving as a current encoding target and the reference picture. Errors between the predicted picture and the encoding target divided picture are encoded and its encoded information is sent to the information source encoding unit 14.

The information source encoding unit 14 performs entropy encoding on the encoded information which is outputs of the intra divided-picture encoding processing unit 12 and the inter divided-picture encoding processing unit 13, and outputs encoded data.

The present embodiment is particularly different from inter divided-picture predictive encoding of the conventional art as shown in Non-Patent Document 3 in that the correlation direction calculating unit 15 which inspects a correlation on the original picture between a pixel of an encoding target picture and a pixel of an encoded picture when there are a plurality of candidates for the reference picture and the reference picture selecting unit 16 which selects an encoded divided picture to which a pixel in a direction having a high correlation belongs as the reference picture are provided.

The correlation direction calculating unit 15 obtains a divided picture having the smallest sum of absolute values or the smallest sum of squares of prediction errors among encoded divided pictures serving as candidates for the reference picture, determines, from its result, a direction of corresponding pixels of the encoded divided picture and its reference picture on the original picture as a direction in which the correlation is high, and notifies the reference picture selecting unit 16 of the correlation direction.

The reference picture selecting unit 16 selects an encoded divided picture in the correlation direction calculated by the correlation direction calculating unit 15 as the reference picture for the encoding target divided picture, and notifies the inter divided-picture encoding processing unit 13 of the reference picture.

Figure 3:
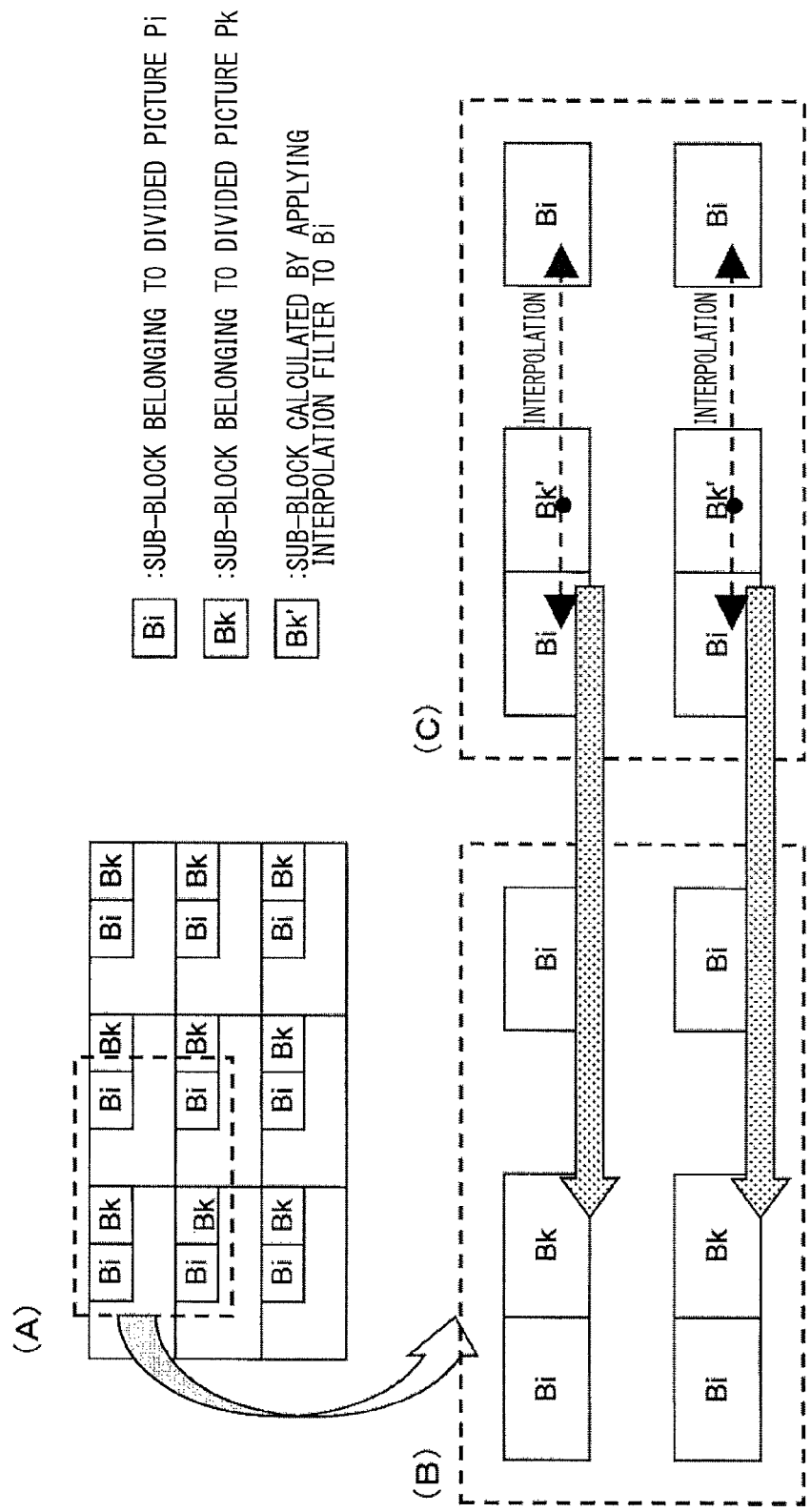
FIG. 3 is a diagram illustrating an example of generating a predicted picture by an inter divided-picture encoding processing unit.

FIG. 3 is a diagram illustrating an example of generating a predicted picture in the inter divided-picture encoding processing unit 13. Hereinafter, an example of generating a predicted picture in which a divided picture Pi is an encoded divided picture serving as the reference picture and a divided picture Pk is an encoding target divided picture on which inter divided-picture predictive encoding is performed will be described. A sub-block belonging to the divided picture Pi is represented as Bi and a sub-block belonging to the divided picture Pk is represented as Bk.

Assuming a positional relationship in the original picture between the sub-block Bi of the divided picture Pi and the sub-block Bk of the divided picture Pk as illustrated in FIG. 3(A), sub-blocks Bi positioned in the vicinity of the sub-block Bk are extracted as illustrated in FIG. 3(B). In this example, two sub-blocks Bi are extracted for one sub-block Bk, but the number of sub-blocks to be extracted is not limited to 2. Next, as illustrated in FIG. 3(C), a pixel value of a sub-block Bk' is calculated by applying an interpolation filter to pixel values of the two extracted sub-blocks Bi. Filter coefficients predetermined by the relative position between the sub-block Bi and the sub-block Bk on the original picture is used as filter coefficients of the interpolation filter. It is to be noted that various conventional methods are known as an interpolation method by an interpolation filter, and a predicted picture may be generated using any interpolation method.

A collection of sub-blocks Bk' generated by the interpolation as described above is determined as a predicted picture to be used in inter divided-picture predictive encoding of the divided picture Pk.

[Flow of Picture Encoding Process]

Figure 4:
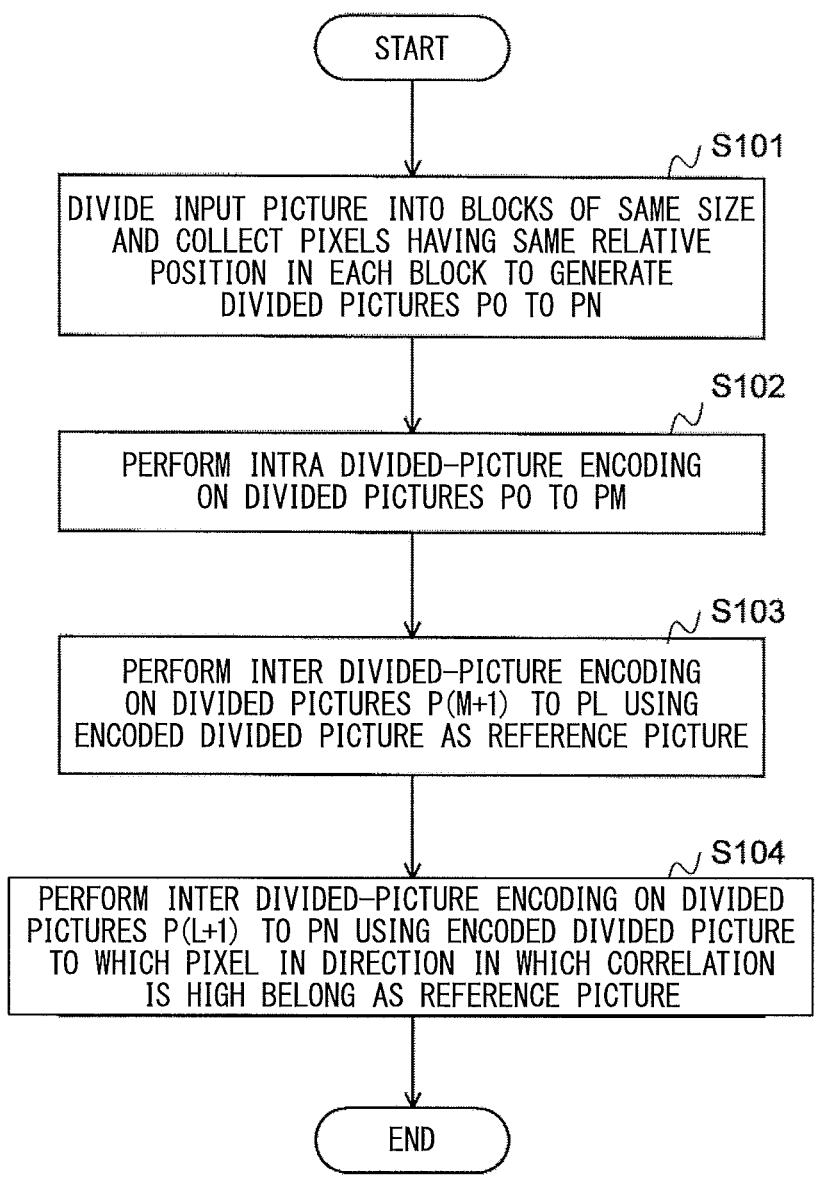
FIG. 4 is a flowchart of a picture encoding process.

FIG. 4 is a flowchart of the picture encoding process. The flow of the picture encoding process will be described in accordance with FIG. 4.

First, the divided picture generating unit 11 generates divided pictures P0 to PN by dividing an input picture into blocks of the same size and collecting sub-blocks (pixels or pixel groups) at the same relative position in each block (step S101).

Next, the intra divided-picture encoding processing unit 12 performs intra divided-picture encoding on some divided pictures P0 to PM (where M<N) among the divided pictures P0 to PN (step S102). Here, it is desirable that positions of the sub-blocks constituting a divided picture serving as a target of the intra divided-picture encoding on the original picture be separated at predetermined intervals. Only the first divided picture P0 may be the target of the intra divided-picture encoding.

Next, the inter divided-picture encoding processing unit 13 performs inter divided-picture encoding on the divided pictures P(M+1) to PL (where M<L<N) using an encoded divided picture as a reference picture (step S103). Each of the divided pictures P(M+1) to PL is, for example, a divided picture when the number of candidates for the reference picture is one, such as a divided picture that is not yet encoded and is adjacent on the right-hand side of a divided picture subjected to the intra divided-picture encoding or a divided picture that is not yet encoded and is directly below the divided picture subjected to the intra divided-picture encoding. Here, the number of the divided picture on which the inter divided-picture encoding is performed can be determined in advance.

Subsequently, the inter divided-picture encoding processing unit 13 performs inter divided-picture encoding on the remaining divided pictures P(L+1) to PN using an encoded divided picture to which a pixel in a direction having a high correlation with respect to an encoding target divided picture belongs selected by the correlation direction calculating unit 15 and the reference picture selecting unit 16 as the reference picture (step S104).

[Detailed Flow (Example 1) of Inter Divided-Picture Encoding Process]

Figure 5:
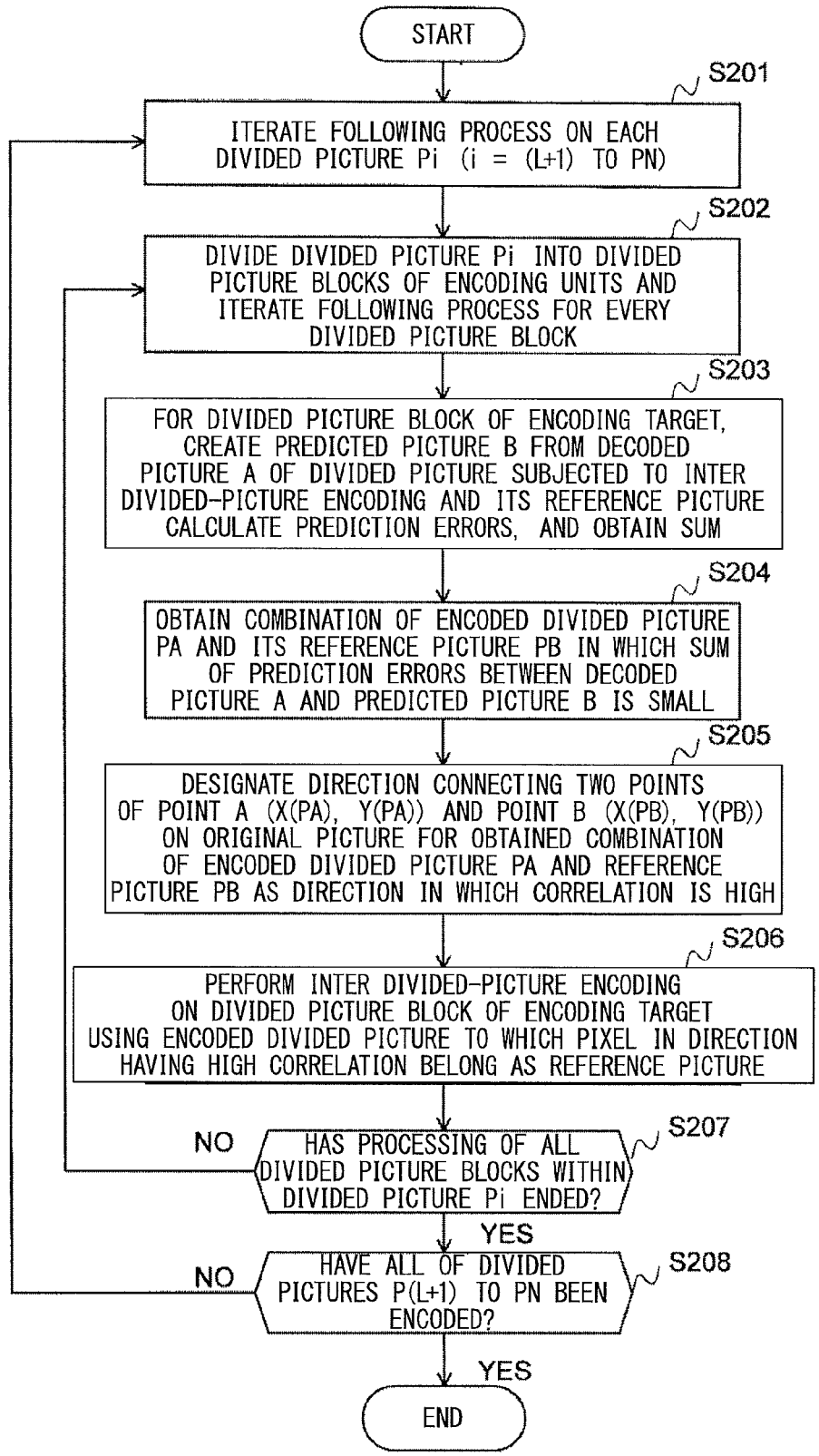
FIG. 5 is a detailed flowchart of an inter divided-picture encoding process (example 1).

FIG. 5 illustrates the first example of the detailed processing flowchart of step S104 illustrated in FIG. 4.

In step S201, a process from step S202 to step S208 is iterated on each divided picture Pi (i is (L+1) to N).

In step S202, each divided picture Pi is divided into divided picture blocks of encoding units and a process from step S203 to step S207 is iterated for every divided picture block. Although this divided picture block corresponds to a macroblock or the like in H.264 coding, such as 16×16 pixels, the size of the divided picture block may be arbitrarily set.

In step S203, for a divided picture block of an encoding target, a predicted picture B is created from a decoded picture A of a divided picture subjected to inter divided-picture encoding and its reference picture, prediction errors which are the difference between the decoded picture A and the predicted picture B are calculated, and a sum of absolute values or a sum of squares (hereinafter, the sum of absolute values or the sum of squares is simply referred to as "sum") of the prediction errors is obtained.

In step S204, a combination of the encoded divided picture (referred to as PA) and its reference picture (referred to as PB) in which the sum of the prediction errors between the decoded picture A and the predicted picture B obtained in step S203 is small is obtained.

In step S205, a direction connecting two points of point A (X(PA), Y(PA)) and point B (X(PB), Y(PB)) on the original picture is determined as a direction in which the correlation is high for the combination of the encoded divided picture PA and the reference picture PB obtained in step S204.

In step S206, for the divided picture block of the encoding target, an encoded divided picture to which a pixel in the direction having the high correlation belongs is selected as a reference picture, a predicted picture is generated from the reference picture, and inter divided-picture encoding is performed.

In step S207, a determination as to whether processing of all divided picture blocks within the divided picture Pi has ended is made; if there is a divided picture block which has not yet been processed, a process from step S202 is iterated for the divided picture block.

In step S208, a determination as to whether all divided pictures P(L+1) to PN have been encoded is made, and the process from step S201 is iterated until all of the divided pictures P(L+1) to PN are encoded.

[Example (Example 1) of Detailed Configuration of Picture Encoding Apparatus]

Figure 6:
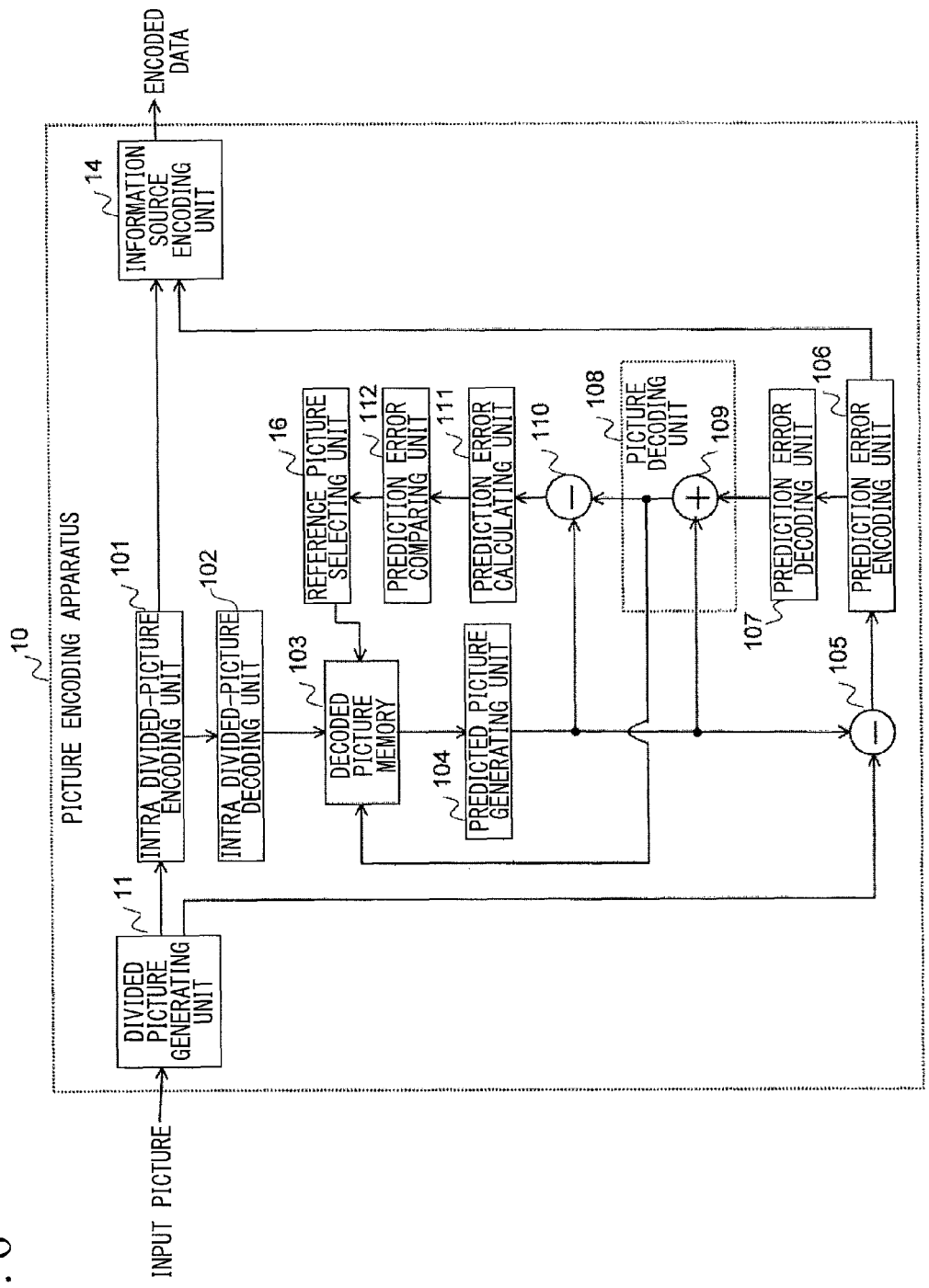
FIG. 6 is a diagram illustrating an example (example 1) of a detailed configuration of the picture encoding apparatus.

FIG. 6 illustrates the example of the detailed configuration of the picture encoding apparatus 10 illustrated in FIG. 1. The picture encoding apparatus 10 illustrated in FIG. 6 is an example of a configuration of an apparatus which executes a process of the first example described with reference to FIG. 5. Because the divided picture generating unit 11, the information source encoding unit 14, and the reference picture selecting unit 16 in FIG. 6 correspond to those of the same reference numerals illustrated in FIG. 1, a description thereof is omitted.

An intra divided-picture encoding unit 101 performs intra divided-picture encoding on divided pictures P0 to PM. An intra divided-picture decoding unit 102 decodes a divided picture encoded by the intra divided-picture encoding unit 101 and stores the decoded picture in a decoded picture memory 103. In the decoded picture memory 103, a decoded picture of a divided picture subjected to inter divided-picture encoding is also stored later.

In order to perform inter divided-picture predictive encoding on a divided picture that is not yet encoded among divided pictures generated by the divided picture generating unit 11, a predicted picture generating unit 104 generates a predicted picture using an encoded divided picture within the decoded picture memory 103 as a reference picture for every divided picture block (hereinafter, the divided picture block may be simply referred to as a divided picture) of the divided picture. In generation of the predicted picture, a predicted picture is generated by applying, to the reference picture, a predetermined filter determined by the relative position between corresponding pixels of the divided picture serving as a current encoding target and the reference picture on the original picture.

A difference calculating unit 105 calculates prediction errors by subtracting each pixel value of the predicted picture generated by the predicted picture generating unit 104 from each pixel value of the divided picture block serving as the current encoding target. A prediction error encoding unit 106 performs an orthogonal transform and a quantization process on the calculated prediction errors to encode the prediction errors.

The information source encoding unit 14 performs entropy encoding on encoded information of the intra divided-picture encoding unit 101 and encoded information of the prediction error encoding unit 106 encoded by inter divided-picture predictive encoding and outputs encoded data.

In the first example, a prediction error decoding unit 107 decodes the prediction errors encoded by the prediction error encoding unit 106. In a picture decoding unit 108, an adder 109 adds the prediction errors decoded by the prediction error decoding unit 107 to the predicted picture generated by the predicted picture generating unit 104 to decode an inter divided-picture encoded picture. It is to be noted that, in the picture decoding unit 108, a post-processing filter such as a deblocking filter may be applied after the predicted picture is added to the prediction errors. The decoded picture of the divided picture, which has been decoded, is stored in the decoded picture memory 103.

A subtractor 110 calculates a difference between the decoded picture of the encoded divided picture and the predicted picture, and a prediction error calculating unit 111 calculates a sum of prediction errors for every encoded divided picture serving as a candidate for the reference picture. A prediction error comparing unit 112 obtains a divided picture having the smallest sum of the prediction errors calculated by the prediction error calculating unit 111, determines, from the result, a direction of corresponding pixels of the encoded divided picture having the smallest sum of the prediction errors and its reference picture on the original picture as a direction in which the correlation is high, and notifies the reference picture selecting unit 16 of the correlation direction.

The reference picture selecting unit 16 selects an encoded divided picture in the correlation direction calculated by the prediction error comparing unit 112 from the decoded picture memory 103 as the reference picture for the divided picture of the encoding target, and notifies the predicted picture generating unit 104 of the reference picture.

[Detailed Flow (Example 2) of Inter Divided-Picture Encoding Process]

Figure 7:
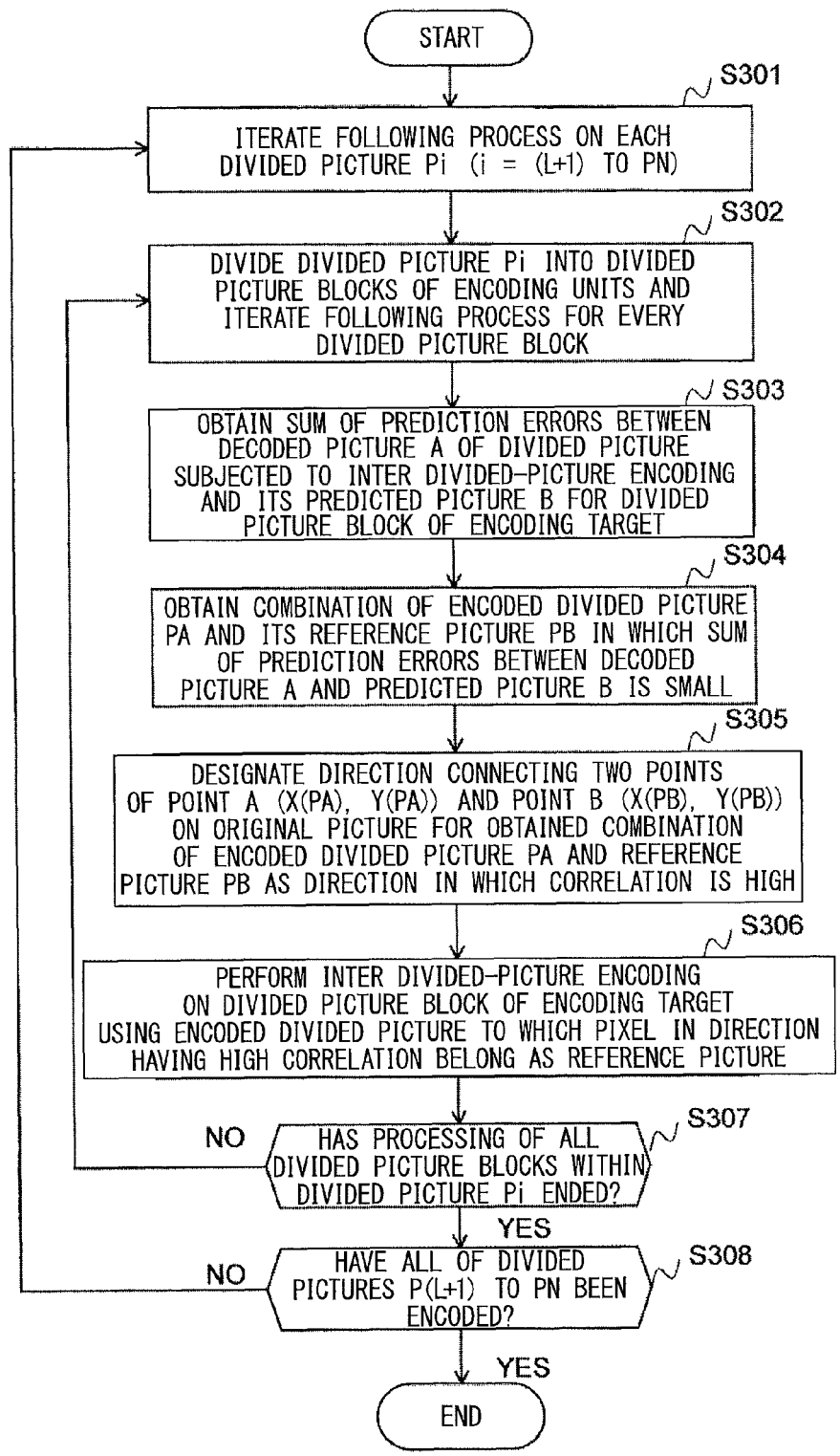
FIG. 7 is a detailed flowchart of an inter-divided picture encoding process (example 2).

FIG. 7 illustrates the second example of the detailed processing flowchart of step S104 illustrated in FIG. 4.

In the second example, the process of step S303 is different from that of the first example, and the other steps S301, S302, and S304 to S308 are the same as steps 201, S202, and S204 to S208 of the first example described with reference to FIG. 5.

In step S303, a sum of prediction errors between the decoded picture A of the divided picture subjected to inter divided-picture encoding and its predicted picture B is obtained for a divided picture block of an encoding target. That is, in step S303, instead of regenerating the predicted picture for every divided picture block, generating the decoded picture A, and obtaining the sum of the prediction errors, the sum of prediction errors is calculated by directly using the prediction errors already generated as encoded data and the correlation is determined. Thereby, an increase in the computational complexity of a decoding calculation is suppressed.

[Example (Example 2) of Detailed Configuration of Picture Encoding Apparatus]

Figure 8:
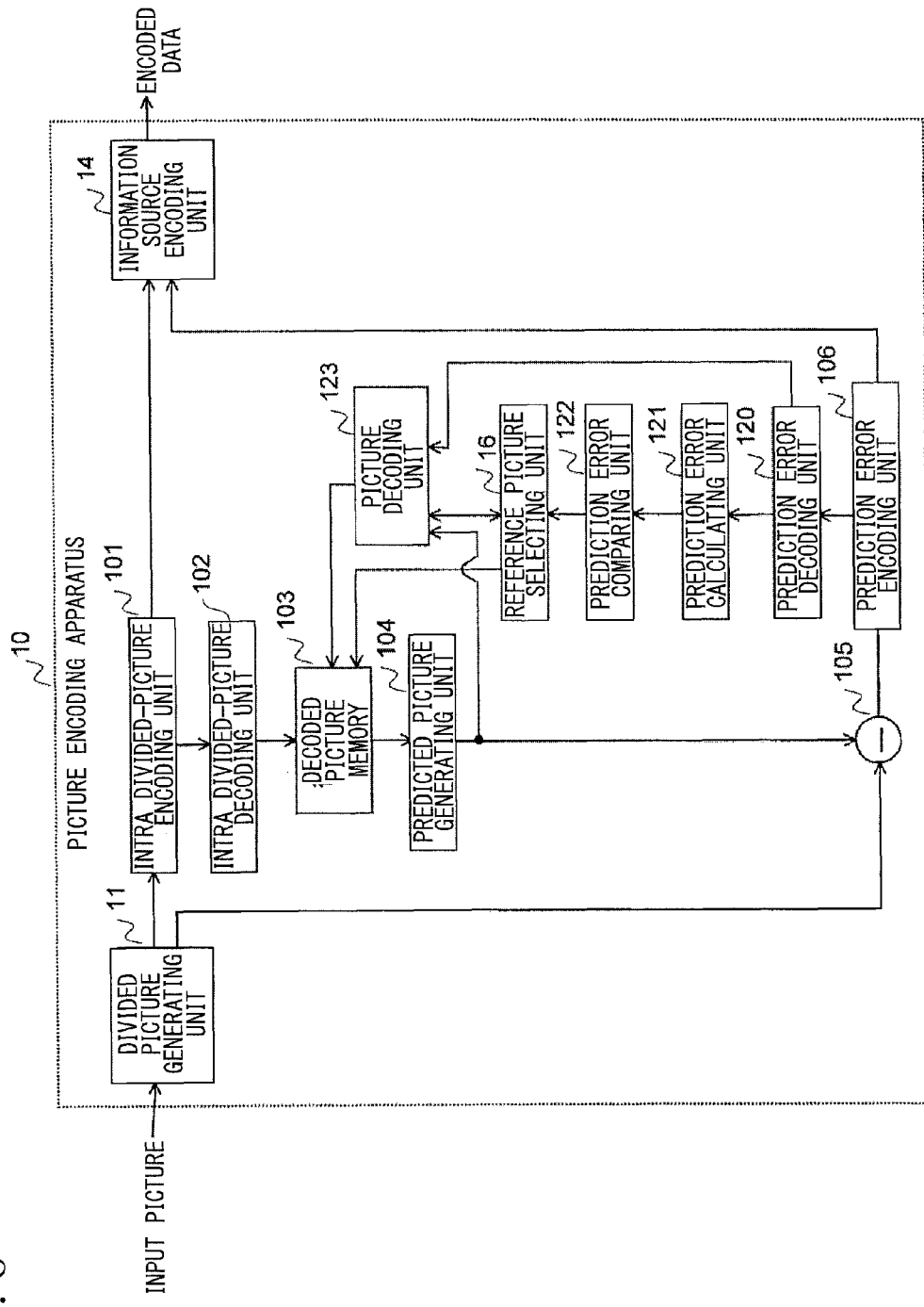
FIG. 8 is a diagram illustrating an example (example 2) of a detailed configuration of the picture encoding apparatus.

FIG. 8 illustrates the second example of the detailed configuration of the picture encoding apparatus 10 illustrated in FIG. 1. The picture encoding apparatus 10 illustrated in FIG. 8 is an example of a configuration of an apparatus which executes the process of the second example described with reference to FIG. 7. Because the components of FIG. 8 having the same reference numerals as those of the picture encoding apparatus 10 of the first example illustrated in FIG. 6 described above have the same functions as those illustrated in FIG. 6, a detailed description thereof is omitted.

In the case of the second example, a prediction error decoding unit 120 decodes prediction errors by applying an inverse quantization process and an inverse orthogonal transform on the prediction errors encoded by the prediction error encoding unit 106. A prediction error calculating unit 121 calculates a sum of the prediction errors decoded by the prediction error decoding unit 120 for every divided picture. A prediction error comparing unit 122 obtains a divided picture having the smallest sum of the prediction errors calculated by the prediction error calculating unit 121, determines, from the result, a direction of corresponding pixels of the encoded divided picture having the smallest sum of the prediction errors and its reference picture on the original picture as a direction in which the correlation is high, and notifies the reference picture selecting unit 16 of the correlation direction.

The reference picture selecting unit 16 notifies a picture decoding unit 123 of the fact that an encoded divided picture in the notified correlation direction is determined as the reference picture for the encoding target divided picture from the result of the prediction error comparing unit 122. The picture decoding unit 123 generates a decoded picture of the notified encoded divided picture from its predicted picture and the prediction errors, and stores it in the decoded picture memory 103. The predicted picture generating unit 104 generates a predicted picture used to encode the encoding target divided picture block using a decoded picture stored in the decoded picture memory 103 as a reference picture.

[Specific Example of Encoding]

Figure 9:
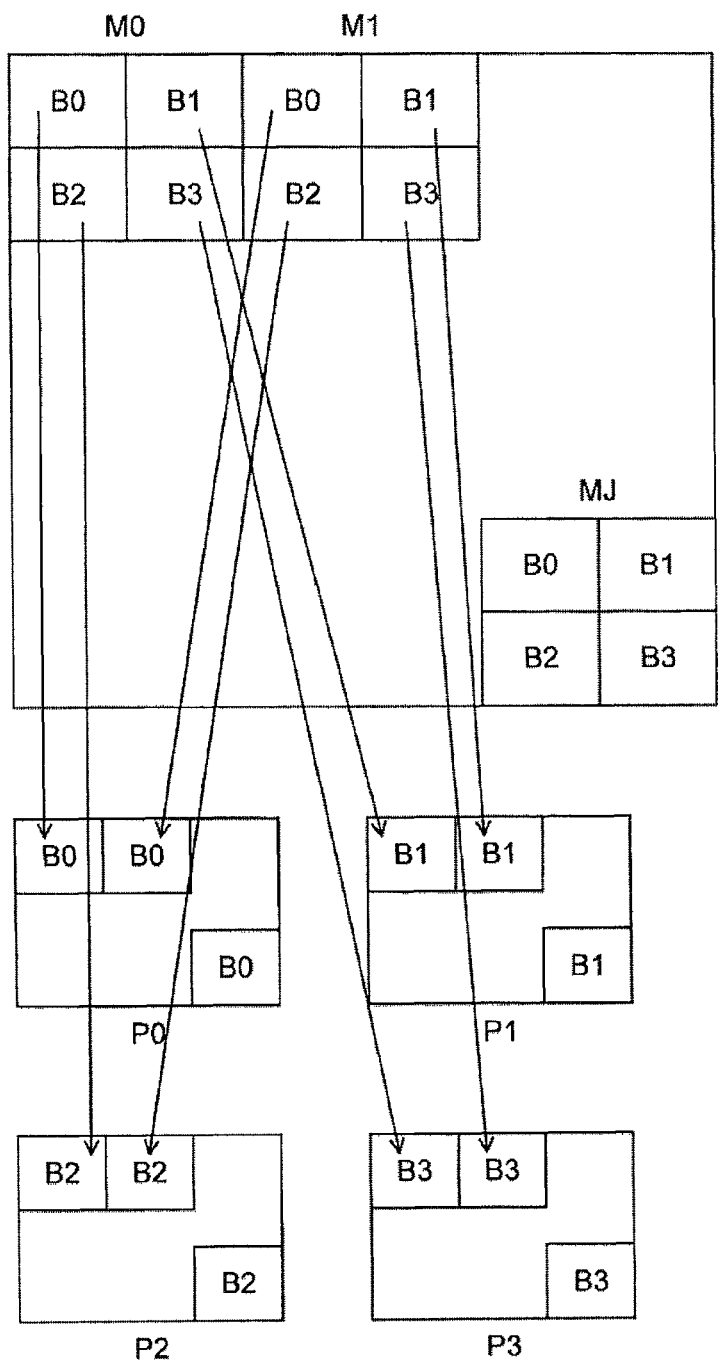
FIG. 9 is a diagram illustrating an example of division of an encoding target picture.

FIG. 9 illustrates an example of division of an encoding target picture. In the example described below, it is assumed that the divided picture generating unit 11 divides one frame of an input picture which is an encoding target into blocks M0, M1, MJ each having 2×2 pixels as illustrated in FIG. 9. Furthermore, it is assumed that the divided picture generating unit 11 divides each of the blocks M0, M1, MJ into sub-blocks B0, B1, B2, and B3 pixel by pixel. It is assumed that a divided picture P0 is obtained by collecting pixels of top-left sub-blocks B0 from M0, M1, MJ divided in this manner, a divided picture P1 is obtained by collecting pixels of top-right sub-blocks B1 therefrom, a divided picture P2 is obtained by collecting pixels of bottom-left sub-blocks B2 therefrom, and a divided picture P3 is obtained by collecting pixels of bottom-right sub-blocks B3 therefrom.

Here, an example in which a block of 2×2 pixels is divided into sub-blocks each having 1×1 pixel will be described. However, the sizes of a block and a sub-block are not limited to those of this example, and a similar implementation can be performed even when the present invention is applied to a larger size of the block or a larger size of the sub-block.

[Process of First Example]

In the first example described above, the following ultra divided-picture encoding and inter divided-picture encoding are performed on a divided picture divided as in FIG. 9.

Process 1-1: Intra divided-picture encoding is performed on a divided picture P0.

Figure 10A:
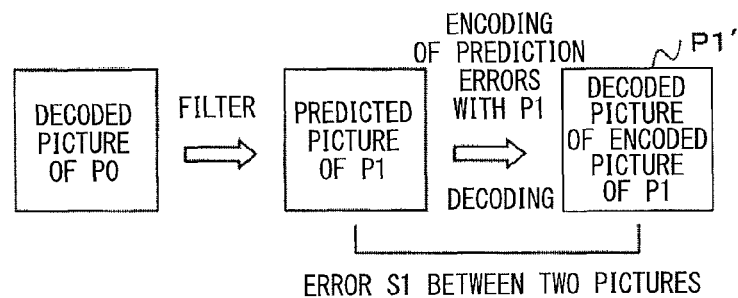
FIG. 10A is a diagram illustrating an example of a reference picture selecting method.

Process 1-2: A predicted picture for a divided picture P1 is generated by applying an interpolation filter to a decoded picture of the divided picture P0 using the decoded picture of the divided picture P0 as a reference picture and inter divided-picture encoding is performed. A decoded picture P1' of the encoded divided picture P1 is generated and stored. Its manner is illustrated in FIG. 10A.

Figure 10B:
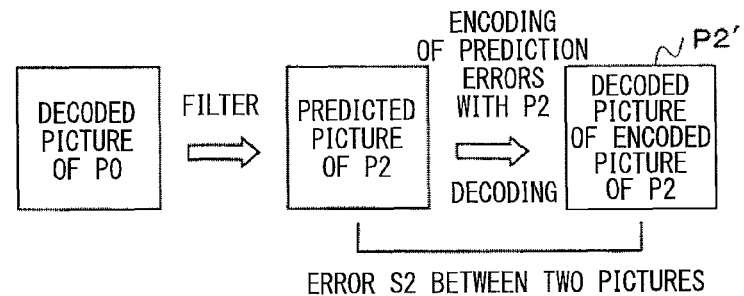
FIG. 10B is a diagram illustrating an example of the reference picture selecting method.

Process 1-3: A predicted picture for a divided picture P2 is generated by applying an interpolation filter to the decoded picture of the divided picture P0 using the decoded picture of the divided picture P0 as a reference picture and inter divided-picture encoding is performed. A decoded picture P2' of the encoded divided picture P2 is generated and stored. Its manner is illustrated in FIG. 10B.

Process 1-4: For the divided pictures P1 and P2, sums S1 and S2 of prediction errors (e.g., a sum of absolute values or sum of square errors of the prediction errors) between the predicted pictures of the divided pictures P1 and P2 and the decoded pictures P1' and P2' are calculated and compared with each other.

Process 1-5: when $S1 \leq S2$.

Figure 10C:
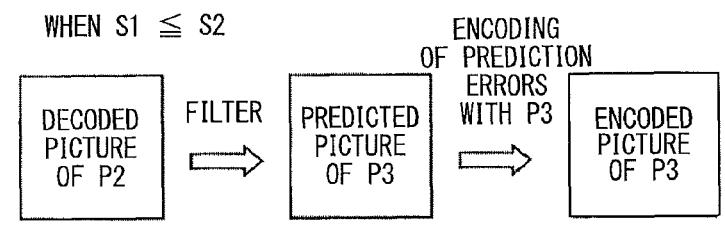
FIG. 10C is a diagram illustrating an example of the reference picture selecting method.

As illustrated in FIG. 10C, the decoded picture of the divided picture P2 is used as a reference picture in inter divided-picture encoding of the divided picture P3. That is, the inter divided-picture encoding of the divided picture P3 is performed by applying an interpolation filter to the decoded picture of the divided picture P2 to generate a predicted picture of the divided picture P3 and encoding prediction errors between the predicted picture and the divided picture P3. This is because a correlation between pixels of the horizontal direction on the original picture is considered to be higher than a correlation between pixels of the vertical direction due to the fact that $S1 \leq S2$.

Process 1-6: when $S1 > S2$.

Figure 10D:
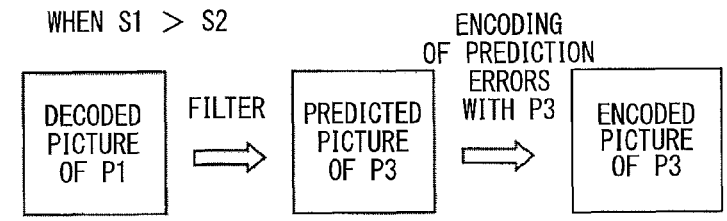
FIG. 10D is a diagram illustrating an example of the reference picture selecting method.

As illustrated in FIG. 10D, the decoded picture of the divided picture P1 is used as a reference picture in inter divided-picture encoding of the divided picture P3. That is, the inter divided-picture encoding of the divided picture P3 is performed by applying an interpolation filter to the decoded picture of the divided picture P1 to generate a predicted picture of the divided picture P3 and encoding prediction errors between the predicted picture and the divided picture P3. This is because a correlation between pixels of the vertical direction on the original picture is considered to be higher than a correlation between pixels of the horizontal direction due to the fact that S1>S2.

[Process of Second Example]

In the second example described above, intra divided-picture encoding and inter divided-picture encoding are performed on the divided pictures divided as in FIG. 9 as follows.

Process 2-1: Intra divided-picture encoding is performed on a divided picture P0.

Process 2-2: A predicted picture for a divided picture P1 is generated by applying an interpolation filter to a decoded picture of the divided picture P0 using the decoded picture of the divided picture P0 as a reference picture and inter divided-picture encoding is performed. At this time, a sum S1 of prediction errors is stored.

Process 2-3: A predicted picture for a divided picture P2 is generated by applying an interpolation filter to the decoded picture of the divided picture P0 using the decoded picture of the divided picture P0 as a reference picture and inter divided-picture encoding is performed. At this time, a sum S2 of prediction errors is stored.

Process 2-4: The sums S1 and S2 of the prediction errors of the divided pictures P1 and P2 are compared with each other.

Process 2-5: when S1≤S2.

A decoded picture of the divided picture P2 is used as a reference picture in inter divided-picture encoding of the divided picture P3. That is, the inter divided-picture encoding of the divided picture P3 is performed by applying an interpolation filter to the decoded picture of the divided picture P2 to generate a predicted picture of the divided picture P3 and encoding the prediction errors between the predicted picture and the divided picture P3.

Process 2-6: when S1>S2.

A decoded picture of the divided picture P1 is used as a reference picture in inter divided-picture encoding of the divided picture P3. That is, the inter divided-picture encoding of the divided picture P3 is performed by applying an interpolation filter to the decoded picture of the divided picture P1 to generate a predicted picture of the divided picture P3 and encoding the prediction errors between the predicted picture and the divided picture P3.

[Picture Decoding Apparatus]

Figure 11:
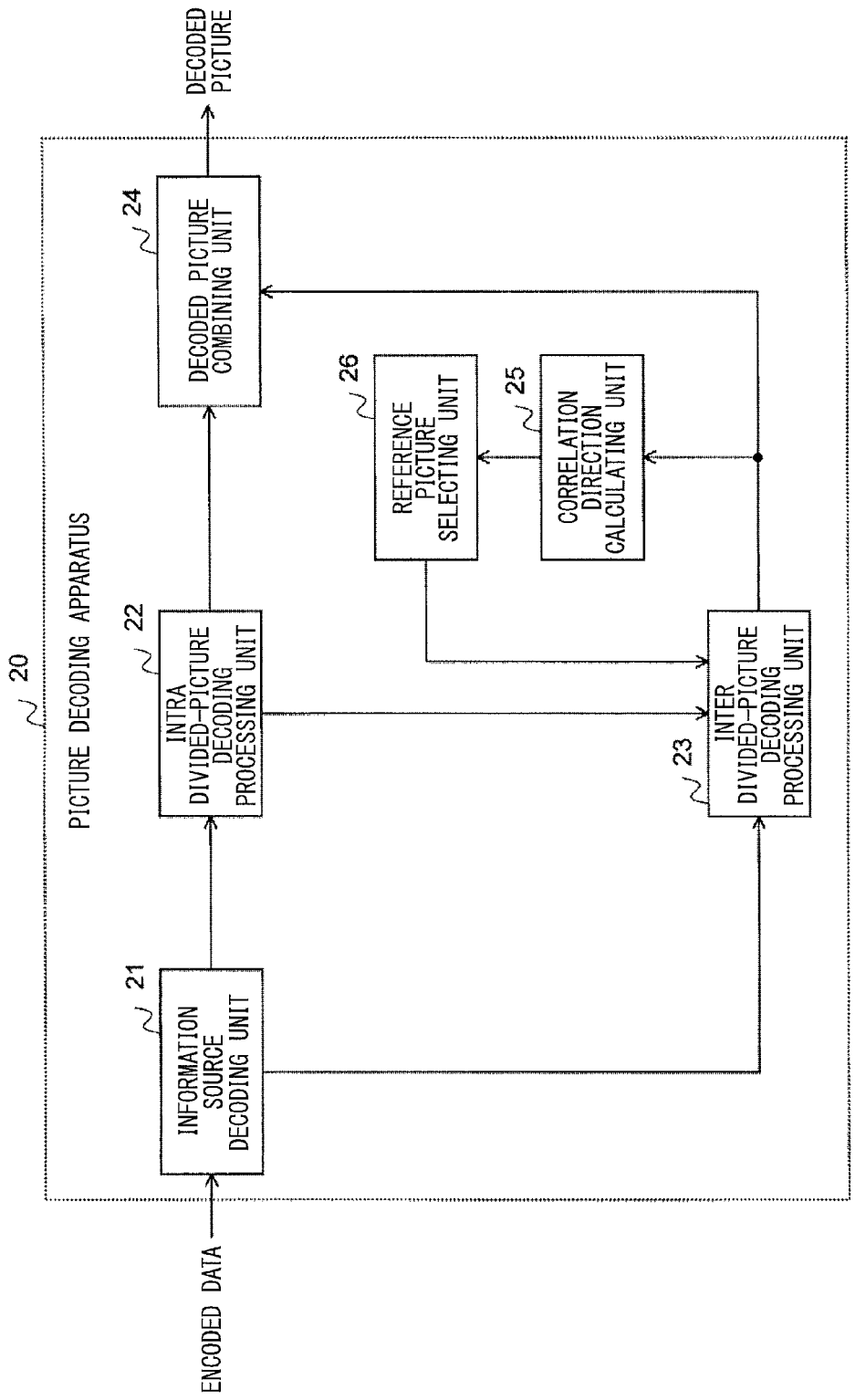
FIG. 11 is a diagram illustrating an example of a configuration of a picture decoding apparatus.

FIG. 11 is a diagram illustrating an example of a configuration of the picture decoding apparatus. The picture decoding apparatus 20 includes an information source decoding unit 21, an intra divided-picture decoding processing unit 22, an inter divided-picture decoding processing unit 23, a decoded picture combining unit 24, a correlation direction calculating unit 25, and a reference picture selecting unit 26.

The picture decoding apparatus 20 inputs encoded data of a picture subjected to compressive encoding by the picture encoding apparatus 10 illustrated in FIG. 1. The information source decoding unit 21 performs entropy decoding on the input encoded data.

The intra divided-picture decoding processing unit 22 performs decoding on encoded data of at least predetermined one divided picture subjected to intra divided-picture encoding in accordance with intra divided-picture prediction. The inter divided-picture decoding processing unit 23 decodes a decoding target divided picture in accordance with inter divided-picture prediction using a decoded divided picture as a reference picture. The divided pictures decoded by the intra divided-picture decoding processing unit 22 and the inter divided-picture decoding processing unit 23 are input to the decoded picture combining unit 24. The decoded picture combining unit 24 generates a decoded picture by arranging each sub-block of the decoded divided pictures at an original position on the original picture.

When the number of candidates for the reference picture is only one, for example, when the number of decoded divided pictures to which a pixel nearest to a pixel position on the original picture of the decoding target divided picture belongs is one, the inter divided-picture decoding processing unit 23 performs inter divided-picture decoding using the decoded divided picture as a reference picture.

When there are a plurality of candidates for the reference picture, for example, when there are a plurality of decoded divided pictures to which a pixel nearest to the pixel position on the original picture of the decoding target divided picture belongs, the correlation direction calculating unit 25 obtains a divided picture in which a sum of absolute values or sum of squares of prediction errors is smallest among the decoded divided pictures serving as the candidates for the reference picture, determines, from the result, a direction of corresponding pixels of the decoded divided picture and its reference picture on the original picture as a direction in which the correlation is high, and notifies the reference picture selecting unit 26 of the correlation direction. The process to be performed by the correlation direction calculating unit 25 is exactly the same as that to be performed by the correlation direction calculating unit 15 in the picture encoding apparatus 10.

The reference picture selecting unit 26 selects a decoded divided picture in the correlation direction calculated by the correlation direction calculating unit 25 as a reference picture for the decoding target divided picture and notifies the inter divided-picture decoding processing unit 23 of the reference picture.

[Flow of Picture Decoding Process]

Figure 12:
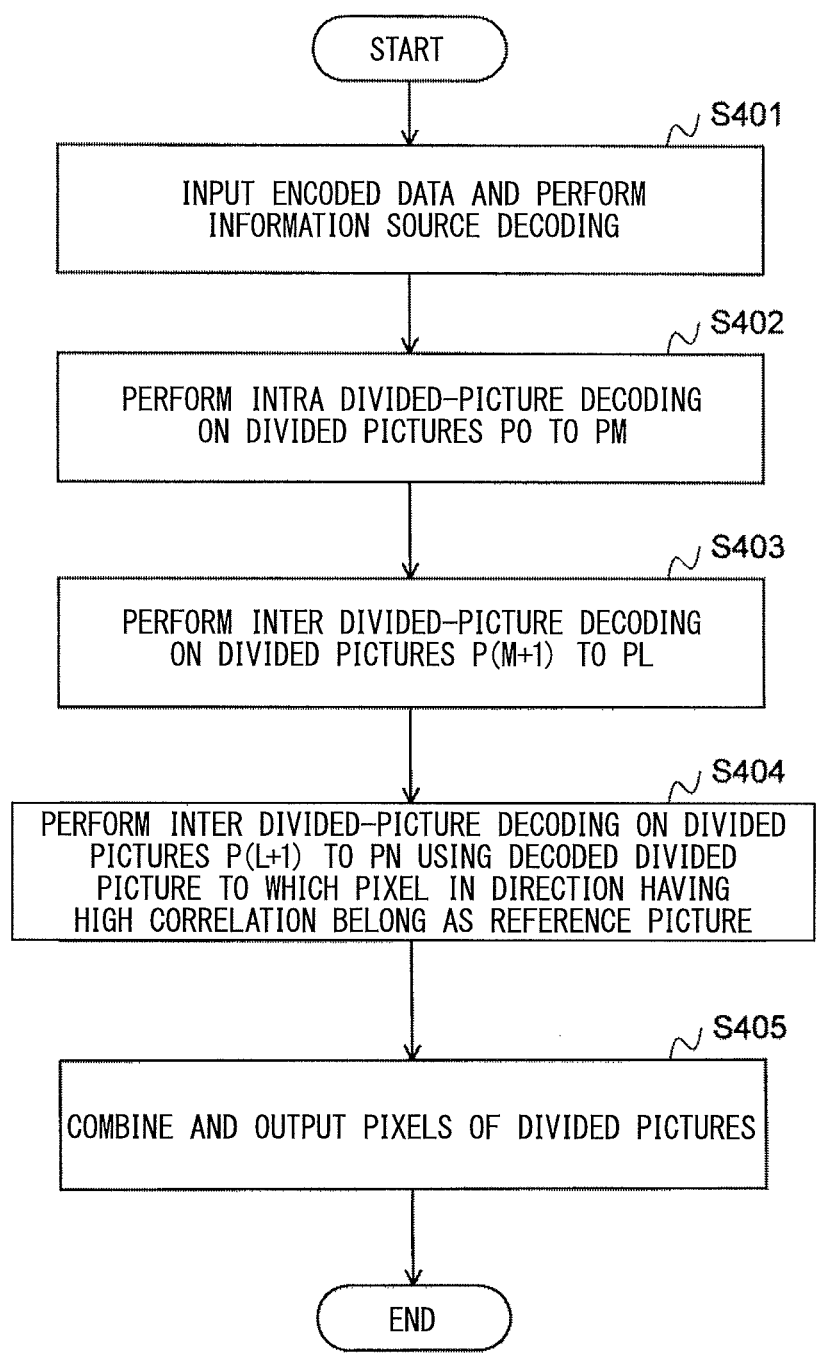
FIG. 12 is a flowchart of a picture decoding process.

FIG. 12 is a flowchart of the picture decoding process. The flow of the picture decoding process will be described in accordance with FIG. 12.

First, the information source decoding unit 21 performs entropy decoding on input encoded data of a decoding target (step S401). Next, the intra divided-picture decoding processing unit 22 performs intra divided-picture decoding using a conventional intra-frame predictive decoding method or the like such as that performed in H.264 for some divided pictures P0 to PM (where M<N) among predetermined divided pictures P0 to PN based on the input encoded data (step S402).

Subsequently, the inter divided-picture decoding processing unit 23 performs inter divided-picture decoding on predetermined divided pictures P(M+1) to PL using a decoded divided picture predetermined for each divided picture as a reference picture (step S403).

Subsequently, the inter divided-picture decoding processing unit 23 performs inter divided-picture decoding on divided pictures P(L+1) to PN that are not yet decoded using a decoded divided picture in a direction having a high spatial correlation selected by the reference picture selecting unit 26 based on the prediction errors of the decoded divided picture as a reference picture (step S404).

Finally, the decoded picture combining unit 24 combines pixels (sub-blocks) of divided pictures decoded by the intra divided-picture decoding processing unit 22 and the inter divided-picture decoding processing unit 23 and outputs as a decoded picture (step S405).

[Example (Example 1) of Detailed Configuration of Picture Decoding Apparatus]

Figure 13:
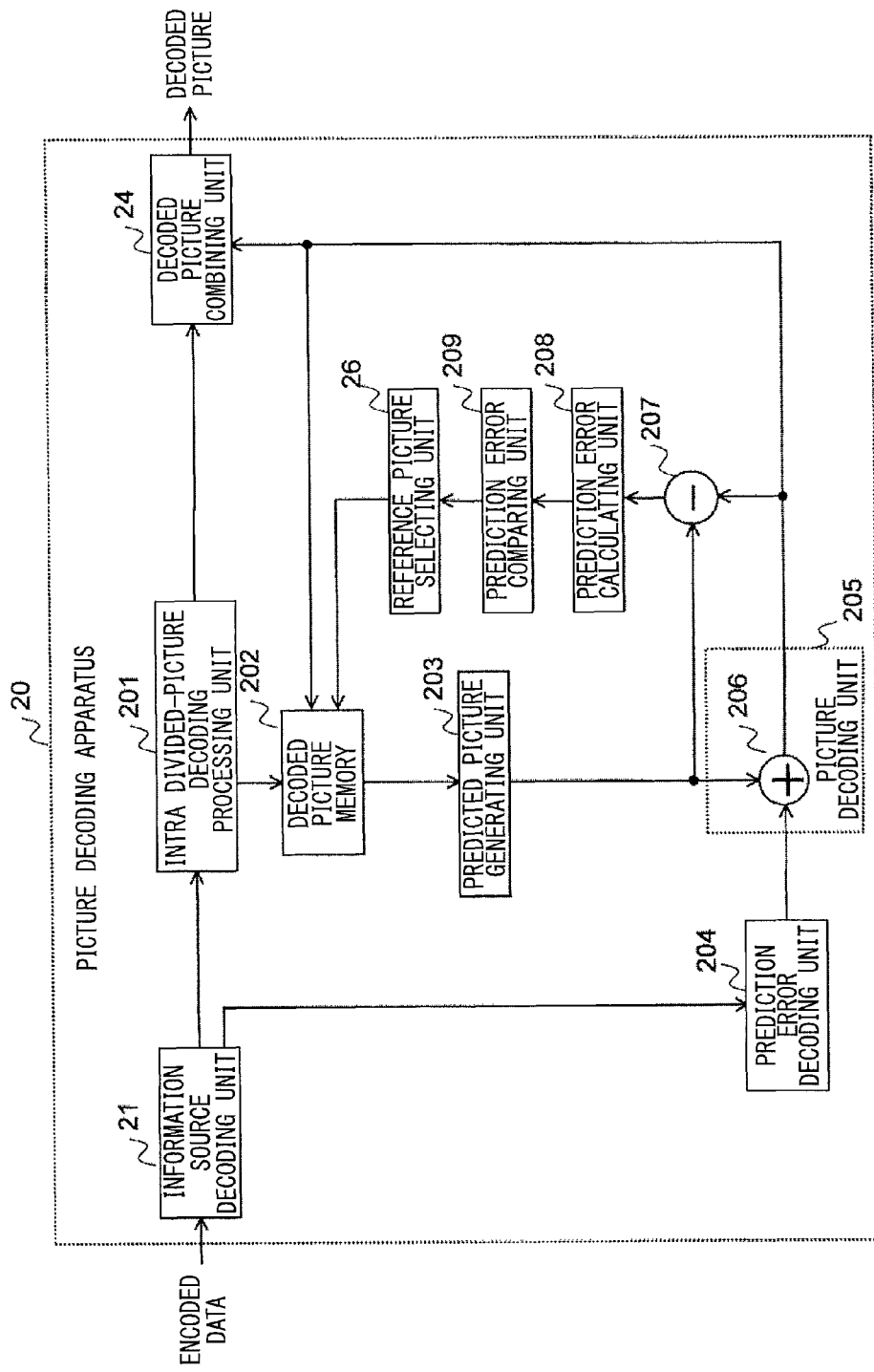
FIG. 13 is a diagram illustrating an example (example 1) of a detailed configuration of the picture decoding apparatus.

FIG. 13 illustrates the first example of the detailed configuration of the picture decoding apparatus 20 illustrated in FIG. 11. Because the information source decoding unit 21, the decoded picture combining unit 24, and the reference picture selecting unit 26 in the picture decoding apparatus 20 illustrated in FIG. 13 correspond to those of the same reference numerals illustrated in FIG. 11, a description thereof is omitted.

An intra divided-picture decoding unit 201 performs intra divided-picture decoding on divided pictures P0 to PM from decoding information of the divided pictures P0 to PM decoded by the information source decoding unit 21 and stores decoded pictures in a decoded picture memory 202. In the decoded picture memory 202, a decoded picture of a divided picture subjected to inter divided-picture decoding is also stored later.

In order to perform inter divided-picture predictive decoding on a divided picture that is not yet decoded, a predicted picture generating unit 203 generates a predicted picture for every divided picture block (hereinafter may be simply referred to as a divided picture) of the divided picture using a decoded divided picture within the decoded picture memory 202 as a reference picture. In generation of the predicted picture, a predicted picture is generated by applying, to the reference picture, a predetermined filter determined by the relative position between corresponding pixels of the divided picture serving as a current decoding target and the reference picture on an original picture.

A prediction error decoding unit 204 decodes prediction errors of the divided picture serving as a target of the inter divided-picture decoding. In a picture decoding unit 205, an adder 206 adds the predicted picture generated by the predicted picture generating unit 203 to the prediction errors decoded by the prediction error decoding unit 204 to generate a decoded picture. It is to be noted that, in the picture decoding unit 205, a post-processing filter such as a deblocking filter may be applied after the predicted picture is added to the prediction errors. This decoded picture is sent to the decoded picture combining unit 24 and stored in the decoded picture memory 202.

A subtractor 207 subtracts each pixel value of the predicted picture generated by the predicted picture generating unit 203 from that of a divided picture block decoded by the picture decoding unit 205 and notifies a prediction error calculating unit 208 of a subtraction result. The prediction error calculating unit 208 calculates a sum of prediction errors for every decoded divided picture serving as a candidate for the reference picture. A prediction error comparing unit 209 obtains a divided picture in which the sum of the prediction errors calculated by the prediction error calculating unit 208 is smallest, determines, from the result, a direction of corresponding pixels of the decoded divided picture having the smallest sum of the prediction errors and its reference picture on the original picture as a direction in which the correlation is high, and notifies the reference picture selecting unit 26 of the correlation direction.

The reference picture selecting unit 26 selects a decoded divided picture in the correlation direction calculated by the prediction error comparing unit 209 from the decoded picture memory 202 as a reference picture for the decoding target divided picture, and notifies the predicted picture generating unit 203 of the reference picture.

[Example (Example 2) of Detailed Configuration of Picture Decoding Apparatus]

Figure 14:
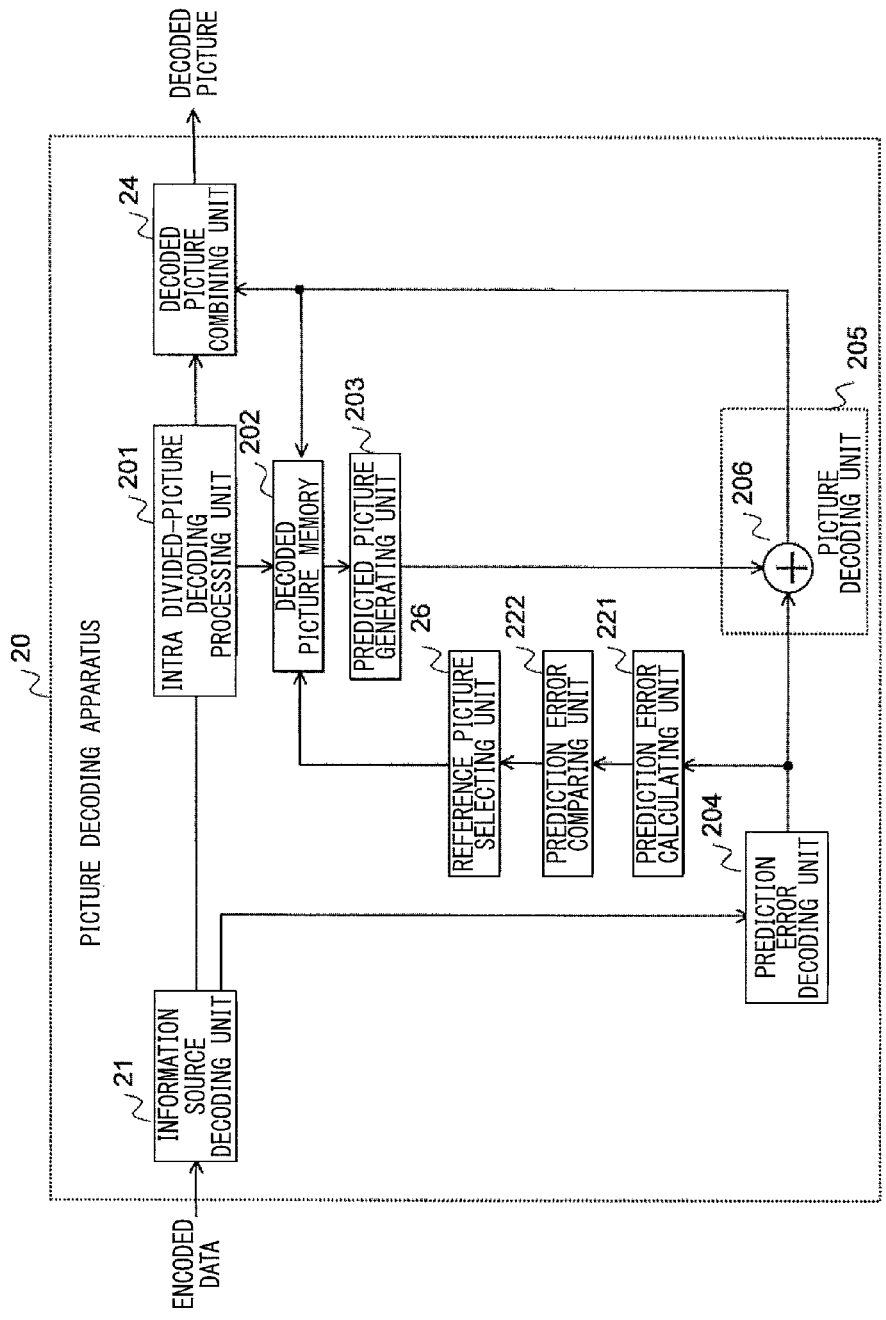
FIG. 14 is a diagram illustrating an example (example 2) of the detailed configuration of the picture decoding apparatus.

FIG. 14 is the second example of the detailed configuration of the picture decoding apparatus 20 illustrated in FIG. 11. Because the components of the picture decoding apparatus 20 illustrated in FIG. 14 having the same reference numerals as those of the first example illustrated in FIG. 13 described above have the same functions as those illustrated in FIG. 13, a detailed description thereof is omitted.

In the case of the second example, a prediction error calculating unit 221 calculates a sum of prediction errors decoded by the prediction error decoding unit 204 for every decoded divided picture (block) serving as a candidate for the reference picture. A prediction error comparing unit 222 obtains a divided picture in which the sum of the prediction errors calculated by the prediction error calculating unit 221 is smallest, determines, from the result, a direction of corresponding pixels of the decoded divided picture having the smallest sum of the prediction errors and its reference picture on the original picture as a direction in which the correlation is high, and notifies the reference picture selecting unit 26 of the correlation direction. The reference picture selecting unit 26 selects a decoded divided picture in the correlation direction calculated by the prediction error comparing unit 222 from the decoded picture memory 202 as a reference picture for the decoding target divided picture, and notifies the predicted picture generating unit 203 of the reference picture.

[Specific Example of Decoding Process of First Example]

An example in which intra divided-picture decoding and inter divided-picture decoding are performed on four divided pictures P0 to P3 obtained by rearranging pixels of blocks each having 2×2 pixels as in FIG. 9 described above will be described as the specific example of the decoding process of the first example.

Process 1-1: Intra divided-picture decoding is performed on a divided picture P0.

Process 1-2: A predicted picture for a divided picture P1 is generated by applying an interpolation filter to a decoded picture of the divided picture P0 using the decoded picture of the divided picture P0 as a reference picture and inter divided-picture decoding is performed. A decoded picture P1' of the decoded divided picture P1 is stored.

Process 1-3: A predicted picture for a divided picture P2 is generated by applying an interpolation filter to the decoded picture of the divided picture P0 using the decoded picture of the divided picture P0 as a reference picture and inter divided-picture decoding is performed. A decoded picture P2' of the decoded divided picture P2 is stored.

Process 1-4: For the divided pictures P1 and P2, sums S1 and S2 of prediction errors (e.g., a sum of absolute values or sum of square errors of the prediction errors) between the predicted pictures of the divided pictures P1 and P2 and the decoded pictures P1' and P2' are calculated and compared with each other.

Process 1-5: when $S1 \leq S2$.

The decoded picture of the divided picture P2 is used as a reference picture in inter divided-picture decoding of the divided picture P3. That is, the inter divided-picture decoding of the divided picture P3 is performed by applying an interpolation filter to the decoded picture of the divided picture P2 to generate a predicted picture of the divided picture P3 and adding the predicted picture to prediction errors of the divided picture P3. This is because a correlation between pixels of the horizontal direction on the original picture is considered to be higher than a correlation between pixels of the vertical direction due to the fact that $S1 \leq S2$.

Process 1-6: when $S1 > S2$.

The decoded picture of the divided picture P1 is used as a reference picture in inter divided-picture decoding of the divided picture P3. That is, the inter divided-picture decoding of the divided picture P3 is performed by applying an interpolation filter to the decoded picture of the divided picture P1 to generate a predicted picture of the divided picture P3 and adding the predicted picture to the prediction errors of the divided picture P3. This is because a correlation between pixels of the vertical direction on the original picture is considered to be higher than a correlation between pixels of the horizontal direction due to the fact that S1>S2.

[Process of Second Example]

In the second example described above, intra divided-picture decoding and inter divided-picture decoding are performed on the divided pictures divided as in FIG. 9 as follows.

Process 2-1: Intra divided-picture decoding is performed on a divided picture P0.

Process 2-2: A predicted picture for a divided picture P1 is generated by applying an interpolation filter to a decoded picture of the divided picture P0 using the decoded picture of the divided picture P0 as a reference picture and inter divided-picture decoding is performed. At this time, a sum S1 of prediction errors is stored.

Process 2-3: A predicted picture for a divided picture P2 is generated by applying an interpolation filter to the decoded picture of the divided picture P0 using the decoded picture of the divided picture P0 as a reference picture and inter divided-picture decoding is performed. At this time, a sum S2 of prediction errors is stored.

Process 2-4: The sums S1 and S2 of the prediction errors of the divided pictures P1 and P2 are compared with each other.

Process 2-5: when S1≤S2.

A decoded picture of the divided picture P2 is used as a reference picture in inter divided-picture decoding of a divided picture P3. That is, the inter divided-picture decoding of the divided picture P3 is performed by applying an interpolation filter to the decoded picture of the divided picture P2 to generate a predicted picture of the divided picture P3 and adding the predicted picture to prediction errors of the divided picture P3.

Process 2-6: when S1>S2.

A decoded picture of the divided picture P1 is used as a reference picture in inter divided-picture decoding of the divided picture P3. That is, the inter divided-picture decoding of the divided picture P3 is performed by applying an interpolation filter to the decoded picture of the divided picture P1 to generate a predicted picture of the divided picture P3 and adding the predicted picture to prediction errors of the divided picture P3.

It is to be noted that, in the above-described embodiments, one or more divided pictures serving as a target of intra divided-picture encoding (the same is also applied to decoding) may be provided for one frame, and an encoding process in intra divided-picture encoding and inter divided-picture encoding may be performed in units of divided picture blocks which are small areas obtained by dividing a divided picture. When a process of inter divided-picture encoding is performed in units of divided picture blocks, a reference picture may be switched based on a comparison of sums of prediction errors in units of divided picture blocks.

[Example of Moving-Picture Encoding Apparatus to which Picture Encoding Apparatus is Applied]

Figure 15:
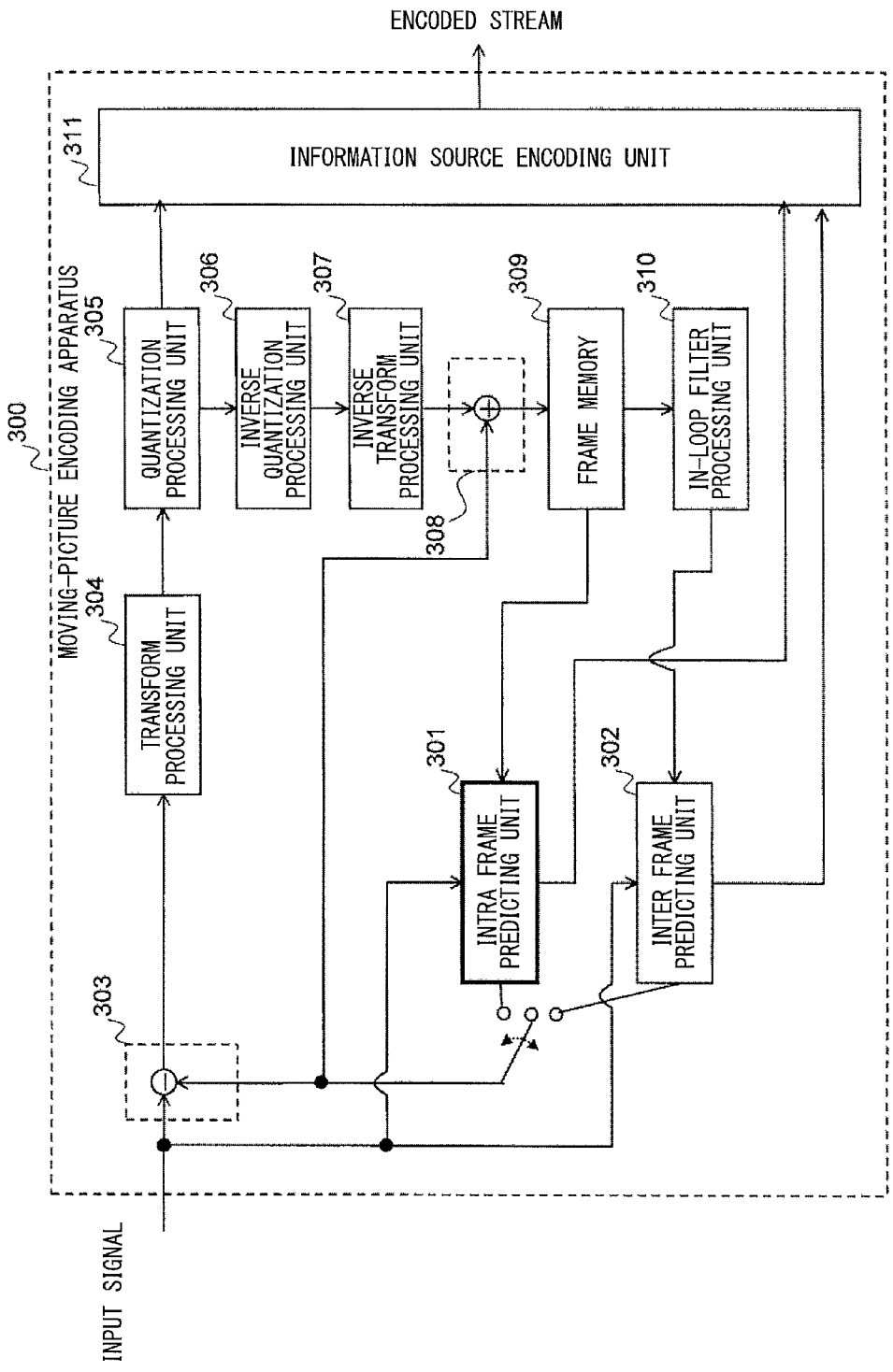
FIG. 15 is a diagram illustrating an example of a moving-picture encoding apparatus to which the present invention is applicable.

FIG. 15 illustrates an example of the moving-picture encoding apparatus to which the present invention is applicable. In the moving-picture encoding apparatus 300, the present invention can be particularly applied to an encoding process associated with an intra frame predicting unit 301. The other components are similar to the configurations of conventional general moving-picture encoding apparatuses used as encoders of H.264 or the like.

The moving-picture encoding apparatus 300 inputs an encoding target video signal, divides a frame of the input video signal into blocks, performs encoding on every block, and outputs its bitstream as an encoded stream. For this encoding, a prediction residual signal generating unit 303 obtains a difference between the input video signal and a prediction signal which is an output of the intra frame predicting unit 301 or an inter frame predicting unit 302 and outputs it as a prediction residual signal. A transform processing unit 304 performs an orthogonal transform such as a discrete cosine transform (DCT) on the prediction residual signal and outputs transform coefficients. A quantization processing unit 305 quantizes the transform coefficients and outputs quantized transform coefficients. An information source encoding unit 311 performs entropy encoding on the quantized transform coefficients and outputs an entropy encoding result as the encoded stream.

On the other hand, the quantized transform coefficients are also input to an inverse quantization processing unit 306 in which inverse quantization is performed. An inverse transform processing unit 307 performs an inverse orthogonal transform on transform coefficients which are an output of the inverse quantization processing unit 306, and outputs a decoded prediction residual signal.

In a decoded signal generating unit 308, a decoded signal of an encoding target block which has been encoded is generated by adding the decoded prediction residual signal to the prediction signal, which is the output of the intra frame predicting unit 301 or the inter frame predicting unit 302. In order that the decoded signal is used as a reference picture in the intra frame predicting unit 301 or the inter frame predicting unit 302, it is stored in a frame memory 309. It is to be noted that when the reference picture is referred to in the inter frame predicting unit 302, an in-loop filter processing unit 310 inputs a picture stored in the frame memory 309, performs a filtering process of reducing coding distortion, and a picture subjected to the filtering process is used as the reference picture.

In the ultra frame predicting unit 301, the encoding processes of the intra divided-picture encoding and the inter divided-picture encoding described in the embodiments of the present invention are performed. The information source encoding unit 311 performs entropy encoding on information about a prediction mode, a motion vector, or the like set in the intra frame predicting unit 301 or the inter frame predicting unit 302, and outputs as an encoded stream.

[Example of Moving-Picture Decoding Apparatus to which Picture Decoding Apparatus is Applied]

Figure 16:
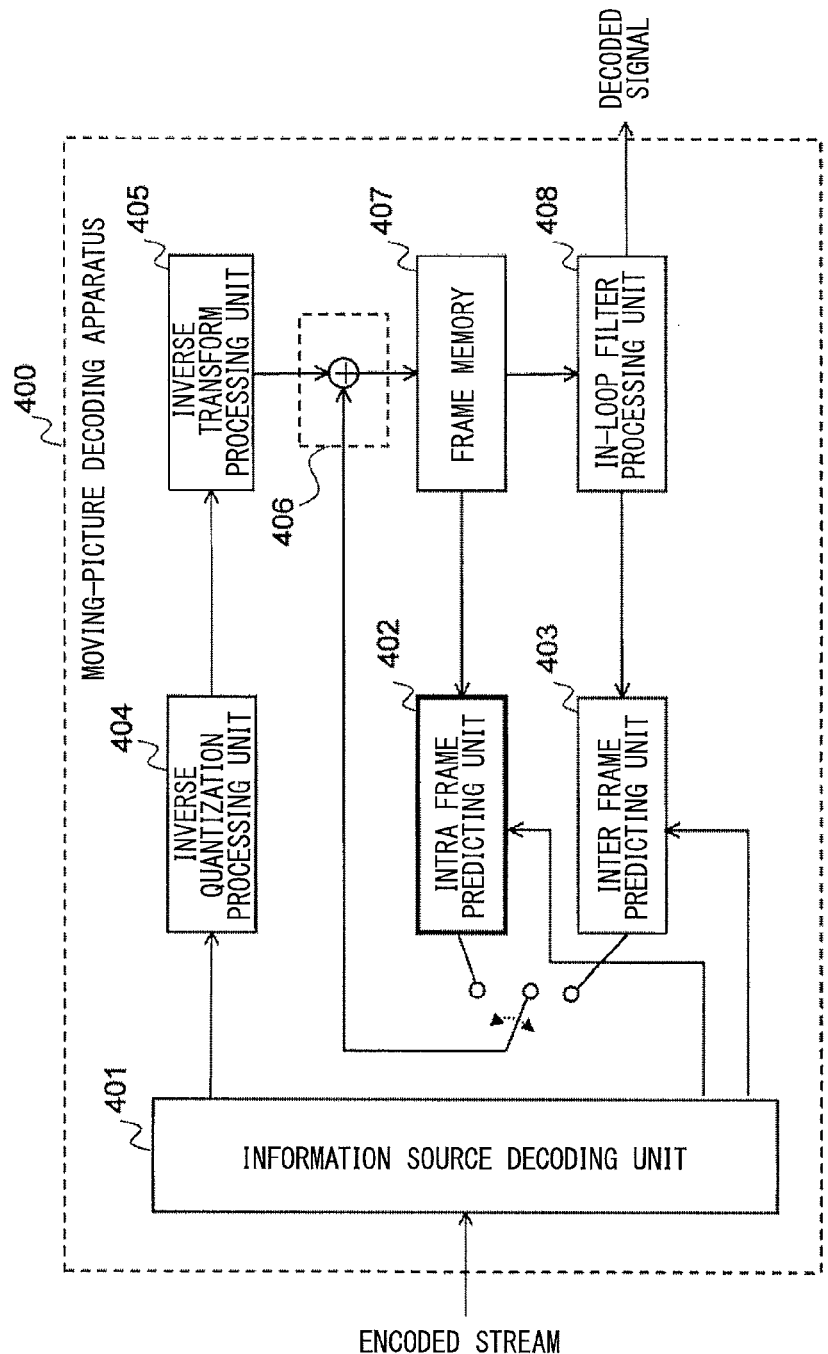
FIG. 16 is a diagram illustrating an example of a moving-picture decoding apparatus to which the present invention is applicable.

FIG. 16 illustrates an example of the moving-picture decoding apparatus to which the present invention is applicable. In the moving-picture decoding apparatus 400, the present invention is particularly applicable to a decoding process associated with an intra frame predicting unit 402. The other components are similar to configurations of conventional general moving-picture decoding apparatuses used as decoders of H.264 and the like.

The moving-picture decoding apparatus 400 inputs an encoded stream encoded by the moving-picture encoding apparatus 300 described with reference to FIG. 15, performs decoding, and outputs a video signal of a decoded picture. For this decoding, an information source decoding unit 401 inputs the encoded stream, performs entropy decoding on quantization transform coefficients of a decoding target block, and decodes information about intra-frame prediction and information about inter-frame prediction. In the intra frame predicting unit 402, the decoding processes of the intra divided-picture decoding and the inter divided-picture decoding described in the embodiments of the present invention are performed.

An inverse quantization processing unit 404 inputs the quantization transform coefficients, performs inverse quantization thereon, and outputs decoded transform coefficients. An inverse transform processing unit 405 performs an inverse orthogonal transform on the decoded transform coefficients and outputs a decoded prediction residual signal. A decoded signal generating unit 406 adds the decoded prediction residual signal to a prediction signal which is an output of the intra frame predicting unit 402 or an inter frame predicting unit 403, and generates a decoded signal of the decoding target block. This decoded signal is stored in a frame memory 407 in order to use the decoded signal as a reference picture in the intra frame predicting unit 402 or the inter frame predicting unit 403. It is to be noted that when the reference picture is referred to in the inter frame predicting unit 403, an in-loop filter processing unit 408 inputs a picture stored in the frame memory 407 and performs a filtering process of reducing coding distortion, and a picture subjected to the filtering process is used as the reference picture.

[Configuration Example by Computer]

Figure 17:
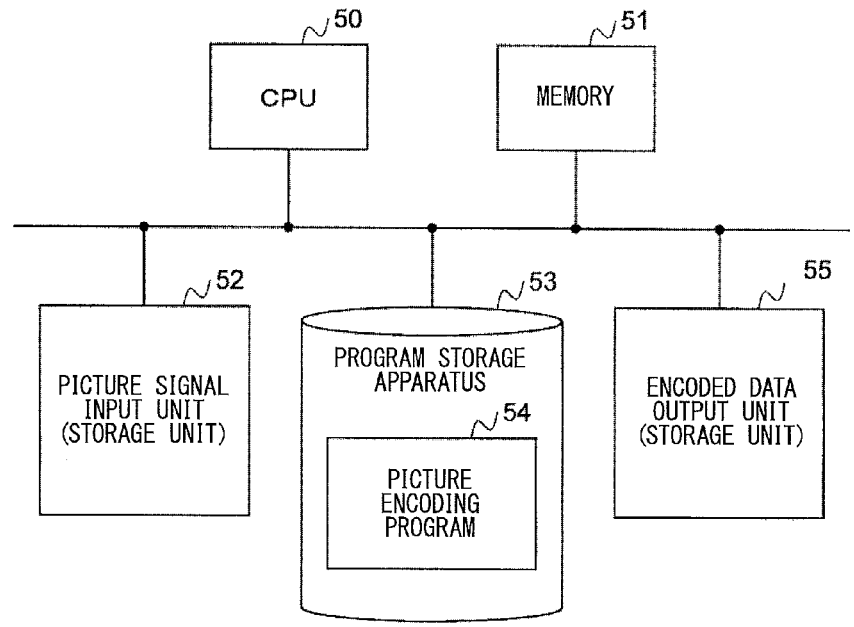
FIG. 17 is a diagram illustrating an example of a configuration of hardware when the picture encoding apparatus is realized using a software program.

FIG. 17 illustrates an example of a configuration of hardware when the picture encoding apparatus 10 of FIG. 1 is configured by a computer and a software program. The present system has a configuration in which a central processing unit (CPU) 50 which executes the program, a memory 51 such as a random access memory (RAM) which stores the program and data to be accessed by the CPU 50, a picture signal input unit 52 (which may be a storage unit which stores a picture signal by a disc apparatus or the like) which inputs an encoding target picture signal from a camera or the like, a program storage apparatus 53 which stores a picture encoding program 54 which is a software program for causing the CPU 50 to execute a process of encoding an input picture in accordance with the present technique, and an encoded data output unit 55 (which may be a storage unit which stores encoded data by a disc apparatus or the like) which outputs the encoded data generated by the CPU 50 executing the picture encoding program 54 loaded to the memory 51, for example, via a network, are connected by a bus.

Figure 18:
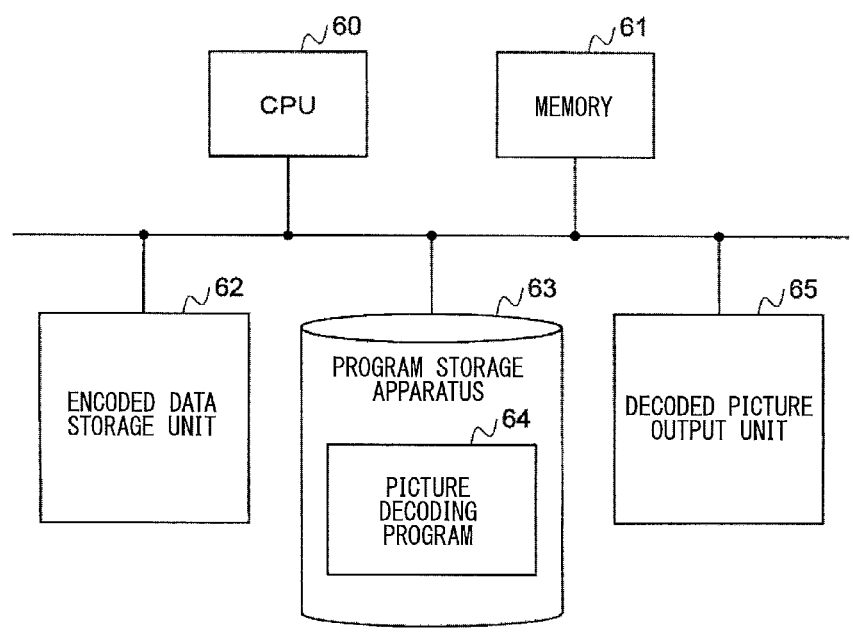
FIG. 18 is a diagram illustrating an example of a configuration of hardware when the picture decoding apparatus is realized using a software program.
Figure 19:
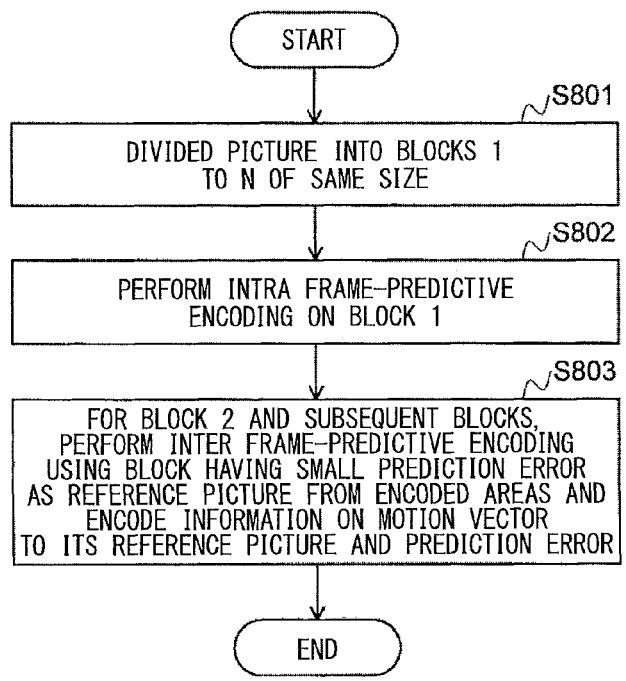
FIG. 19 is a flowchart illustrating an example of an intra-frame predictive encoding process in accordance with the conventional art.
Figure 20:
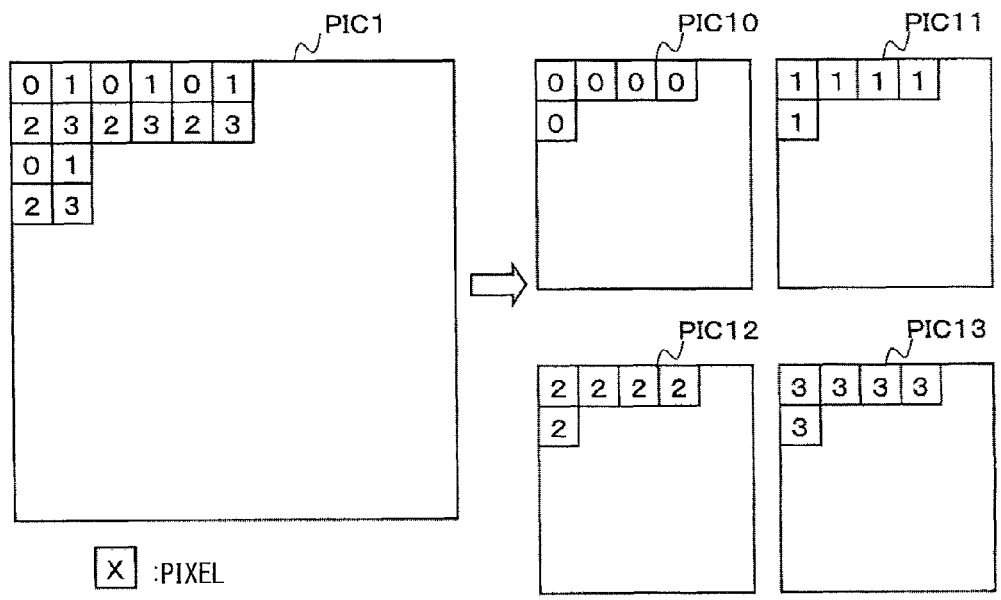
FIG. 20 is a diagram illustrating an example of a conventional intra-picture predictive encoding process using divided pictures obtained by extracting pixels at fixed intervals.
Figure 21:
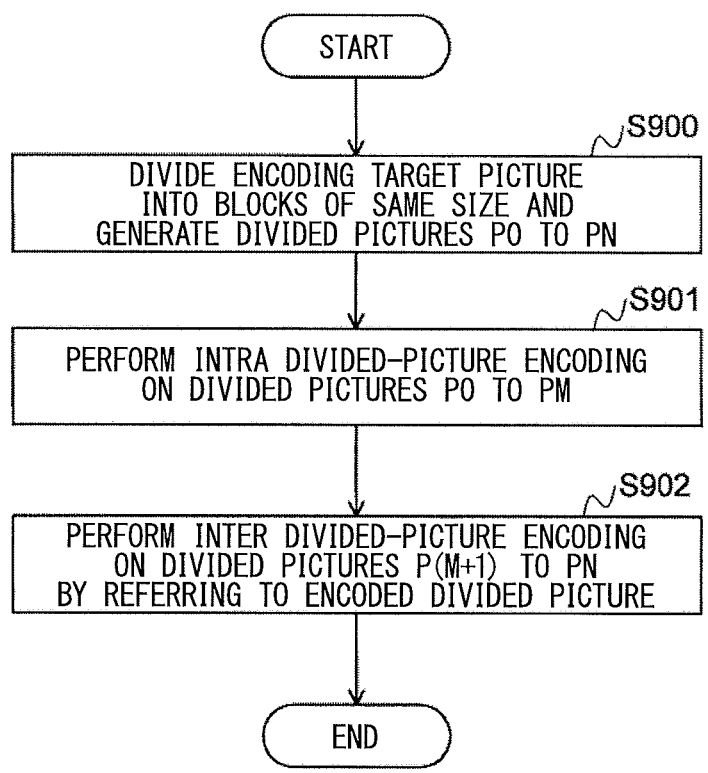
FIG. 21 is a flowchart of the conventional intra-picture predictive encoding process using the divided pictures obtained by extracting the pixels at the fixed intervals.

FIG. 18 illustrates an example of a configuration of hardware when the picture decoding apparatus 20 of FIG. 11 is configured by a computer and a software program. The present system has a configuration in which a CPU 60 which executes the program, a memory 61 such as a RAM which stores the program and data to be accessed by the CPU 60, an encoded data storage unit 62 (which may be an input unit via a network or the like) which inputs and stores encoded data encoded by the picture encoding apparatus 10 of FIG. 1 in accordance with the present technique, a program storage apparatus 63 which stores a picture decoding program 64 which is a software program for causing the CPU 60 to execute a process of decoding the encoded data in accordance with the present technique, and a decoded picture output unit 65 which outputs, to a reproduction apparatus or the like, a decoded picture which is obtained by the CPU 60 executing the picture decoding program 64 loaded to the memory 61 to perform decoding on the encoded data are connected by a bus.

While embodiments of the present invention have been described above with reference to the drawings, it is apparent that the above-described embodiments are examples of the present invention and the present invention is not limited by the above-described embodiments. Therefore, additions, omissions, substitutions, and other modifications of structural elements can be made without departing from the spirit or scope of the present invention.

INDUSTRIAL APPLICABILITY

The present invention is applicable to, for example, intra-frame predictive encoding and decoding. In accordance with the present invention, it is possible to improve the coding efficiency and reduce the computational complexity involved in a deblocking filter process.

DESCRIPTION OF REFERENCE SIGNS

10 Picture encoding apparatus
11 Divided picture generating unit
12 Intra divided-picture encoding processing unit
13 Inter divided-picture encoding processing unit
14 Information source encoding unit
15, 25 Correlation direction calculating unit
16, 26 Reference picture selecting unit
20 Picture decoding apparatus
21 Information source decoding unit
22 Intra divided-picture decoding processing unit
23 Inter divided-picture decoding processing unit
24 Decoded picture combining unit

The invention claimed is:

1. A picture encoding method for performing compressive encoding on an input picture, the picture encoding method comprising:

a divided picture generating step of, when the input picture is divided into blocks each having n×m pixels and each divided block is divided into sub-blocks each having $n_1 \times m_1$ pixels (where $1 \leq n_1 < n$ and $1 \leq m_1 < m$), setting divided pictures of the same size including a set of pixels of sub-blocks having the same relative position within the blocks;

an intra divided-picture encoding step of performing intra divided-picture encoding on at least one of the divided pictures;

an inter divided-picture encoding step of selecting, among encoded divided pictures, an encoded divided picture having the shortest distance on an original picture with respect to pixels at the same position in an encoding target divided picture and the encoded divided pictures as a reference picture, generating a predicted picture for the encoding target divided picture using the selected reference picture, and performing inter divided-picture encoding;

a correlation direction calculating step of calculating a direction in which a correlation with a pixel on the original picture is highest with respect to pixels at the same position in each encoded divided picture serving as a candidate for the reference picture and a reference picture of each encoded divided picture serving as the candidate for the reference picture based on a prediction error in inter divided-picture prediction of each encoded divided picture serving as the candidate for the reference picture when a plurality of candidates for the reference picture are present;

a reference picture selecting step of selecting an encoded divided picture in the direction in which the correlation is high for the encoding target divided picture as the reference picture when the plurality of candidates for the reference picture are present; and an information source encoding step of performing information source encoding on encoding results in the intra divided-picture encoding step and the inter divided-picture encoding step.

2. The picture encoding method according to claim 1, wherein, in the correlation direction calculating step, a predicted picture is generated from a decoded picture of each encoded divided picture serving as a candidate for the reference picture and a reference picture of each encoded divided picture, a sum of prediction errors of the predicted picture for the decoded picture of each encoded divided picture is calculated, and a direction connecting pixels on the original picture corresponding to pixels at the same position in a combination of an encoded divided picture in which the sum of the prediction errors is smallest and a reference picture is determined as the direction in which the correlation is high.

3. The picture encoding method according to claim 1, wherein, in the correlation direction calculating step, a sum of prediction errors calculated in the inter divided-picture encoding is calculated for each encoded divided picture serving as a candidate for the reference picture, and a direction connecting pixels on the original picture corresponding to pixels at the same position in a combination of an encoded divided picture in which the sum of the prediction errors is smallest and a reference picture is determined as the direction in which the correlation is high.

4. The picture encoding method according to claim 1, 2, or 3, wherein, in at least the inter divided-picture encoding step, the correlation direction calculating step, and the reference picture selecting step, a process of encoding the divided pictures, a process of calculating a correlation direction, and a process of selecting the reference picture are performed for each of picture blocks into which each divided picture is divided, and the reference picture in the inter divided-picture encoding is switched for every picture block.

5. A picture decoding method for performing decoding on encoded data of a picture subjected to compressive encoding in which, when an input picture is divided into blocks each having nxm pixels and each divided block is divided into sub-blocks each having $n_1 \times m_1$ pixels (where $1 \leq n_1 < n$ and $1 \leq m_1 < m$), divided pictures of the same size including a set of pixels of sub-blocks having the same relative position within the blocks are set and encoding for every divided picture is performed, the picture decoding method comprising:
   an information source decoding step of inputting the encoded data of the picture subjected to the compressive encoding and performing information source decoding;
   an intra divided-picture decoding step of performing intra divided-picture decoding on at least one of the divided pictures from data decoded in the information source decoding step;
   an inter divided-picture decoding step of selecting, among decoded divided pictures, a decoded divided picture having the shortest distance on an original picture with respect to pixels at the same position in a decoding target divided picture and the decoded divided pictures as a reference picture, generating a predicted picture for the decoding target divided picture using the selected reference picture, and performing inter divided-picture decoding;
   a correlation direction calculating step of calculating a direction in which a correlation with a pixel on the original picture is highest with respect to pixels at the same position in each decoded divided picture serving as a candidate for the reference picture and a reference picture of each decoded divided picture serving as the candidate for the reference picture based on a prediction error in inter divided-picture prediction of each decoded divided picture serving as the candidate for the reference picture when a plurality of candidates for the reference picture are present;
   a reference picture selecting step of selecting a decoded divided picture in the direction in which the correlation is high for the decoding target divided picture as the reference picture when the plurality of candidates for the reference picture are present; and
   a decoded picture combining step of combining a decoded picture from a divided picture decoded in the intra divided-picture decoding step and a divided picture decoded in the inter divided-picture decoding step.

6. The picture decoding method according to claim 5, wherein, in the correlation direction calculating step, a predicted picture is generated from each decoded divided picture serving as a candidate for the reference picture and a reference picture of each decoded divided picture, a sum of prediction errors of the predicted picture for each decoded divided picture is calculated, and a direction connecting pixels on the original picture corresponding to pixels at the same position in a combination of a decoded divided picture in which the sum of the prediction errors is smallest and a reference picture is determined as the direction in which the correlation is high.

7. The picture decoding method according to claim 5, wherein, in the correlation direction calculating step, a sum of prediction errors calculated in the inter divided-picture decoding is calculated for each decoded divided picture serving as a candidate for the reference picture, and a direction connecting pixels on the original picture corresponding to pixels at the same position in a combination of a decoded divided picture in which the sum of the prediction errors is smallest and a reference picture is determined as the direction in which the correlation is high.

8. The picture decoding method according to claim 5, 6 or 7, wherein, in at least the inter divided-picture decoding step, the correlation direction calculating step, and the reference picture selecting step, a process of decoding the divided picture, a process of calculating a correlation direction, and a process of selecting the reference picture are performed for each of picture blocks into which each divided picture is divided, and the reference picture in the inter divided-picture decoding is switched for every picture block.

9. A picture encoding apparatus which performs compressive encoding on an input picture, the picture encoding apparatus comprising:
   a divided picture generating unit which, when the input picture is divided into blocks each having nxm pixels and each divided block is divided into sub-blocks each having $n_1 \times m_1$ pixels (where $1 \leq n_1 < n$ and $1 \leq m_1 < m$), sets divided pictures of the same size including a set of pixels of sub-blocks having the same relative position within the blocks;
   an intra divided-picture encoding unit which performs intra divided-picture encoding on at least one of the divided pictures;
   an inter divided-picture encoding unit which selects, among encoded divided pictures, an encoded divided picture having the shortest distance on an original picture with respect to pixels at the same position in an encoding target divided picture and the encoded divided pictures as a reference picture, generates a predicted picture for the encoding target divided picture using the selected reference picture, and performs inter divided-picture encoding;
   a correlation direction calculating unit which calculates a direction in which a correlation with a pixel on the original picture is highest with respect to pixels at the same position in each encoded divided picture serving as a candidate for the reference picture and a reference picture of each encoded divided picture serving as the candidate for the reference picture based on a prediction error in inter divided-picture prediction of each encoded divided picture serving as the candidate for the reference picture when a plurality of candidates for the reference picture are present;

a reference picture selecting unit which selects an encoded divided picture in the direction in which the correlation is high for the encoding target divided picture as the reference picture when the plurality of candidates for the reference picture are present; and an information source encoding unit which performs information source encoding on encoding results by the intra divided-picture encoding unit and the inter divided-picture encoding unit.

10. The picture encoding apparatus according to claim 9, wherein the correlation direction calculating unit generates a predicted picture from a decoded picture of each encoded divided picture serving as a candidate for the reference picture and a reference picture of each encoded divided picture, calculates a sum of prediction errors of the predicted picture for the decoded picture of each encoded divided picture, and determines a direction connecting pixels on the original picture corresponding to pixels at the same position in a combination of an encoded divided picture in which the sum of the prediction errors is smallest and a reference picture as the direction in which the correlation is high.

11. The picture encoding apparatus according to claim 9, wherein the correlation direction calculating unit calculates a sum of prediction errors calculated in the inter divided-picture encoding for each encoded divided picture serving as a candidate for the reference picture, and determines a direction connecting pixels on the original picture corresponding to pixels at the same position in a combination of an encoded divided picture in which the sum of the prediction errors is smallest and a reference picture as the direction in which the correlation is high.

12. The picture encoding apparatus according to claim 9, 10, or 11, wherein at least the inter divided-picture encoding unit, the correlation direction calculating unit, and the reference picture selecting unit perform a process of encoding the divided pictures, a process of calculating a correlation direction, and a process of selecting the reference picture for each of picture blocks into which each divided picture is divided, and switch the reference picture in the inter divided-picture encoding for every picture block.

13. A picture decoding apparatus for performing decoding on encoded data of a picture subjected to compressive encoding in which, when an input picture is divided into blocks each having n×m pixels and each divided block is divided into sub-blocks each having $n_1 \times m_1$ pixels (where $1 \leq n_1 < n$ and $1 \leq m_1 < m$), divided pictures of the same size including a set of pixels of sub-blocks having the same relative position within the blocks are set and encoding for every divided picture is performed, the picture decoding apparatus comprising:

an information source decoding unit which inputs the encoded data of the picture subjected to the compressive encoding and performs information source decoding;

an intra divided-picture decoding unit which performs intra divided-picture decoding on at least one of the divided pictures from data decoded by the information source decoding unit;

an inter divided-picture decoding unit which selects, among decoded divided pictures, a decoded divided picture having the shortest distance on an original picture with respect to pixels at the same position in a decoding target divided picture and the decoded divided pictures as a reference picture, generates a predicted picture for the decoding target divided picture using the selected reference picture, and performs inter divided-picture decoding;

a correlation direction calculating unit which calculates a direction in which a correlation with a pixel on the original picture is highest with respect to pixels at the same position in each decoded divided picture serving as a candidate for the reference picture and a reference picture of each decoded divided picture serving as the candidate for the reference picture based on a prediction error in inter divided-picture prediction of each decoded divided picture serving as the candidate for the reference picture when a plurality of candidates for the reference picture are present;

a reference picture selecting unit which selects a decoded divided picture in the direction in which the correlation is high for the decoding target divided picture as the reference picture when the plurality of candidates for the reference picture are present; and a decoded picture combining unit which combines a decoded picture from a divided picture decoded by the intra divided-picture decoding unit and a divided picture decoded in the inter divided-picture decoding unit.

14. The picture decoding apparatus according to claim 13, wherein the correlation direction calculating unit generates a predicted picture from each decoded divided picture serving as a candidate for the reference picture and a reference picture of each decoded divided picture, calculates a sum of prediction errors of the predicted picture for each decoded divided picture, and determines a direction connecting pixels on the original picture corresponding to pixels at the same position in a combination of a decoded divided picture in which the sum of the prediction errors is smallest and a reference picture as the direction in which the correlation is high.

15. The picture decoding apparatus according to claim 13, wherein the correlation direction calculating unit calculates a sum of prediction errors calculated in the inter divided-picture decoding for each decoded divided picture serving as a candidate for the reference picture, and determines a direction connecting pixels on the original picture corresponding to pixels at the same position in a combination of a decoded divided picture in which the sum of the prediction errors is smallest and a reference picture as the direction in which the correlation is high.

16. The picture decoding apparatus according to claim 13, 14 or 15, wherein at least the inter divided-picture decoding unit, the correlation direction calculating unit, and the reference picture selecting unit perform a process of decoding the divided picture, a process of calculating a correlation direction, and a process of selecting the reference picture for each of picture blocks into which each divided picture is divided, and switch the reference picture in the inter divided-picture decoding for every picture block.

17. A non-transitory computer-readable medium for storing a picture encoding program for causing a computer to execute the picture encoding method according to claim 1, 2, or 3.

18. A non-transitory computer-readable medium for storing a picture decoding program for causing a computer to execute the picture decoding method according to claim 5, 6, or 7.

* * * * *